US012809387B2

(12) United States Patent
Cornew et al.

(10) Patent No.: US 12,809,387 B2
(45) Date of Patent: Nov. 24, 2026

(54) METHOD AND SYSTEM FOR TRAINING AND LOCALIZING AN AUTONOMOUS FORKLIFT

(71) Applicant: Corvus Robotics, Inc., Mountain View, CA (US)

(72) Inventors: Thomas Marc Cornew, Mountain View, CA (US); Liam Flanagan, San Jose, CA (US); Alexander Joseph Mikhalev, Fremont, CA (US); Mohammed Hanif Kabir, Mountain View, CA (US); Elijah Reed, Mountain View, CA (US); Yue Wu, Mountain View, CA (US)

(73) Assignee: Corvus Robotics, Inc., Mountain View, CA (US)

( * ) Notice: Subject to any disclaimer, the term of this patent is extended or adjusted under 35 U.S.C. 154(b) by 294 days.

(21) Appl. No.: 18/805,201

(22) Filed: Aug. 14, 2024

(65) Prior Publication Data

US 2026/0050262 A1 Feb. 19, 2026

(51) Int. Cl.

| | |
|---|---|
| ***G05D 1/246*** | (2024.01) |
| ***B65G 1/137*** | (2006.01) |
| ***B66F 9/06*** | (2006.01) |
| ***G06Q 10/08*** | (2023.01) |

(52) U.S. Cl.

CPC ......... *G05D 1/2462* (2024.01); *B65G 1/1371* (2013.01); *B66F 9/063* (2013.01); *G06Q 10/08* (2013.01)

(58) Field of Classification Search

CPC ..... G05D 1/2462; B65G 1/1371; B66F 9/063; B66F 9/0755; G06Q 10/08

See application file for complete search history.

(56) References Cited

U.S. PATENT DOCUMENTS

| | | | | |
|---|---|---|---|---|
| 10,353,395 | B2 * | 7/2019 | Hance | G05D 1/0236 |
| 2019/0370567 | A1 | 12/2019 | Eckman | |
| 2021/0284448 | A1 | 9/2021 | Lee | |
| 2021/0374659 | A1 | 12/2021 | Ganapathi et al. | |
| 2024/0265342 | A1 | 8/2024 | Prasad et al. | |

FOREIGN PATENT DOCUMENTS

| | | | | |
|---|---|---|---|---|
| JP | 2009051587 | A * | 3/2009 | |
| JP | 7118123 | B2 * | 8/2022 | B65G 1/1373 |
| KR | 10-2023-0079850 | | 6/2023 | |

* cited by examiner

*Primary Examiner* — Justin Holmes

(74) *Attorney, Agent, or Firm* — Dority & Manning, P.A.

(57) ABSTRACT

A localization system for a forklift performing inventory management is disclosed. The system may access map data comprising a dimensional layout of a warehouse environment. The method includes receiving from one or more forklift sensors associated with a forklift, forklift operation data, the forklift operation data indicative of one or more forklift operation behaviors performed during an operation period. The method includes receiving from one or more scanning sensors, inventory data, the inventory data indicative of one or more inventory items scanned during the operation period. The method includes, based at least in part on the map data, the forklift operation data, and the inventory data, concurrently generating localization data to localize the forklift in the warehouse environment during the operation period.

20 Claims, 9 Drawing Sheets

AB12345678910

300

700

METHOD AND SYSTEM FOR TRAINING AND LOCALIZING AN AUTONOMOUS FORKLIFT

BACKGROUND

Effective supply chain planning relies on effective management of warehouse inventory. Many warehouses utilize a fleet of forklifts to move warehouse inventory throughout the warehouse. Although operating forklifts require prior training and certification, forklift operations are still subject to human error resulting in collisions, scanning errors, and inefficiencies such as lost warehouse inventory.

SUMMARY

The present disclosure is directed to techniques for allowing a forklift to localize, navigate, and manipulate objects within a warehouse. Localization, navigation, and manipulation techniques according to the present disclosure may provide for improved forklift operations by using machine-learned models to observe a forklift during its operation, concurrently localize the forklift during its operations, and assist in operation of the forklift. In some embodiments, the forklift may generate motion plans to operate autonomously or semi-autonomously.

For example, a forklift may include one or more forklift sensors configured to observe the forklift as it operates within a warehouse environment. The forklift sensors may capture control data (e.g., forklift control data), image data, and other sensor data (e.g., audio, LIDAR, etc.). The forklift control data may depict the movement or operation of the controls (e.g., wheel, throttle, mast etc.) as they are used during operation of the forklift. As the forklift operates within the warehouse, scanning sensors may scan inventory and acquire inventory data (e.g. barcode information, inventory label text or handwritten information, volumetric information such as dimensions or box counts, object recognition, etc.). For instance, the forklift may scan inventory items in (e.g., to store at a particular location) or out (e.g., to move to a new location). The operation data and inventory may be used by one or more machine-learned models to localize the forklift within the warehouse. In an embodiment, the operation data and inventory data may be used to train an autonomous or semi-autonomous forklift to operate within the warehouse environment.

By way of example, a forklift operator may operate a forklift within a warehouse. For instance, the forklift operator may be assigned to pick five inventory items from the warehouse for outbound shipment. As the forklift operator begins operating the forklift to complete the picking assignment (e.g., mission), the forklift sensors installed on the forklift may observe the forklift operator (e.g., to generate forklift operation data) as they navigate through the warehouse to each of the inventory items and operates the forklift mast to pick (e.g., retrieve, etc.) the inventory items from their expected locations. As the forklift operator picks each inventory item one or more scanning sensors installed on the forklift may scan the inventory items to indicate that the item has been successfully retrieved. During operation, a localization machine-learned model may use the operation data and inventory data to concurrently localize the forklift. Concurrently localizing the forklift may include determining a position or location of the forklift within the warehouse environment simultaneously, instantaneously, or approximately at the same time as the forklift operation data and inventory data are captured.

For instance, a localization model may access map data depicting a dimensional map of the warehouse environment. The localization model may concatenate the operation data (e.g., indicating the movement/operations of the forklift) and the inventory data (e.g., last scan) to determine a location of the forklift within the warehouse. By way of example, the localization model may concatenate forklift operation data indicating the forklift mast is at a maximum fork height (MFH) and the inventory data indicating that an inventory item was scanned on a top shelf of an inventory rack (e.g., at its expected location) at a point in time during the operation period. The localization model may generate localization data at the point in time indicating the location of the forklift within the warehouse based on map data indicating the specific rack and shelf (e.g., on the dimensional map) where the inventory item was scanned. In an embodiment, the localization model may use fiducial beacons (e.g. 2D code formats such as Apriltags, ARtags, etc.) or wireless beacons (e.g. Bluetooth, etc.) to aid in its localization. As the forklift continues throughout its operation period (e.g., to complete the mission), the localization model may concurrently localize the forklift to determine its location.

In an embodiment, the localization model may also access mission data indicating the list of items the forklift is assigned to retrieve or store. Mission data may include data indicating the list of inventory items (e.g., and their expected locations) that are assigned to the forklift during the operation period. In an embodiment mission data may be used to generate a motion plan for the forklift. By way of example, mission data may indicate that the forklift is assigned to store three inventory items in three different locations within the warehouse during an operation period. The mission data may also indicate the specific racks and shelves where the respective inventory items should be stored (e.g., expected location). Based on the mission data indicating the expected locations of assigned inventory items during the operation period, the localization model may concatenate the map data and inventory data to determine a location and position of the forklift within the warehouse. The localization data may be input into a motion planning model to generate a motion plan for the forklift. For instance, based on the current location and position of the forklift (e.g., indicated by the localization data) and the mission data indicating a subsequent location (e.g., to store a subsequent inventory item), the motion planning model may generate a motion plan to navigate the forklift from the current location and position to the subsequent location. In some embodiment, the motion planning model may generate a motion plan to operate a portion of the forklift controls (e.g., mast, throttle, etc.) to store the inventory item once localizing the forklift at the proper location.

In an embodiment, the data observed during operation of the forklift may be used to train one or more machine-learned models to operate the forklift autonomously or semi-autonomously. For instance, the motion planning model may utilize the forklift operation data to generate a training dataset. The training dataset may train the motion planning model to implement forklift operator behaviors. By way of example, as the forklift operator operates the forklift to complete the mission (e.g., picking assignment, etc.,) the forklift sensors may capture detailed control data such as the speed or acceleration of the forklift during the operation period, the turning radius of the wheel while operating the mast, or events such as forklift jerk (e.g., level of smoothness of a forklift's operation). Ground truth data may be generated based on the forklift operation data indicating positive behaviors (e.g., minimizing jerk, etc.) and negative behaviors (e.g., collisions, significant jerk, etc.). The training data set may be input into a motion planning model to train the motion planning model to implement forklift operations behaviors autonomously (e.g., with no human operator present) or semi-autonomously (e.g., with human operator present).

For instance, the forklift may utilize the localization model to autonomously localize the forklift within the warehouse environment and utilize the motion planning model to navigate through the warehouse environment to satisfy the mission data without a human operator. In another embodiment, the forklift may utilize the localization model to localize the forklift to provide location and/or routing information to a human operator who may not be familiar with the warehouse environment (e.g. displayed on a screen facing the operator or transmitted to a mobile device used by the operator). In other embodiments, the forklift may utilize the motion planning model to operate a first portion of the forklift while the forklift operator operates a second portion of the forklift. For instance, the forklift operator may operate the forklift to navigate to the location of an inventory item and the forklift may utilize the motion planning model to generate a motion plan to operate the mast associated with the forklift to retrieve or store an inventory item. While examples herein describe specific examples of autonomous and semi-autonomous forklift operations, the present disclosure is not limited to such embodiments and may be implemented to control any operation or sub-operation of a forklift or to other types of vehicles that may operate within a warehouse setting or provide loading, unloading, transport, or storage related operations.

The localization and training techniques of the present disclosure may provide a number of technical benefits for improvements of the performance of forklifts. For instance, by utilizing forklift operations data and map data, the forklift is able to more effectively and consistently determine its own location within a warehouse, decreasing on-board computing resources over time. For example, the forklift may focus on more discrete tasks such as active avoidance and inventory tracking. This helps to reduce the complexity of training or building heuristics for the autonomy system. This is also an improvement over previous systems which utilize traditional tracking systems to track a forklift throughout a warehouse. Furthermore, the described localization and training techniques allow forklifts to maximize utilization while improving the efficiency of inventory scanning. For example, the forklift may be trained to operate semi-autonomously to perform more difficult maneuvers while allowing the forklift operator to perform rudimentary operations such as navigating the warehouse environment. Semi-autonomous operation may increase the safety of forklift operations and decrease human error.

For example, in an aspect, the present disclosure provides an example computing system. The computing system may include one or more processors and one or more non-transitory computer-readable media storing instructions that when executed cause the computing system to perform operations. The operations may include accessing map data including a dimensional layout of a warehouse environment. The operations may include receiving from one or more forklift sensors associated with a forklift, forklift operation data, the forklift operation data indicative of one or more forklift operation behaviors performed during an operation period. The operations may include receiving from one or more scanning sensors, inventory data, the inventory data indicative of one or more inventory items scanned during the operation period. The operations may include, based at least in part on the map data, forklift operation data, and inventory data, concurrently generating localization data to localize the forklift in the warehouse environment during the operation period.

In some embodiments, the forklift is at least one of (i) an autonomous, (ii) a semi-autonomous forklift, or (iii) a human operated forklift.

In some embodiments, the forklift operation data is generated by a forklift operator, wherein the forklift operator operates the forklift during the operation period.

In some embodiments, the one or more forklift operation behaviors includes at least one of: (i) navigating the forklift through the warehouse environment, (ii) adjusting a vertical position of a mast associated with the forklift, (iii) moving the one on more inventory items from a first location to a second location, or (iv) scanning the one or more inventory items.

In some embodiments, the operations include analyzing the forklift operation behaviors to generate a ground truth dataset, wherein the ground truth dataset is used to train a machine-learned model.

In some embodiments, at least one forklift sensor of the one or more forklift sensors is positioned on a backrest of the forklift.

In some embodiments, concurrently generating localization data includes accessing mission data associated with the operation period, wherein the mission data is indicative of expected locations of the one or more inventory items within the warehouse environment. In some embodiments, concurrently generating localization data includes, based on the mission data, concatenating the map data, the forklift operation data, and the inventory data to determine a location and a position of the forklift within the warehouse environment at a time during the operation period.

In some embodiments, concurrently generating localization data includes, in response to concatenating the map data, the forklift operation data, and the inventory data, determining a path of travel of the forklift, the path of traveling including one or more waypoints that lead to the expected locations of the one or more inventory items.

In some embodiments, the operations include generating, based on the location and the position, a motion plan for the forklift, the motion plan indicative of at least one of an updated location or an updated position of the forklift. In some embodiments, the operations include controlling the forklift based on the motion plan.

In some embodiments, the position of the forklift is indicative of at least one of: (i) an orientation of the forklift relative to a rack or (ii) a vertical mast position of the forklift.

In some embodiments, the localization data is generated concurrently using a machine-learned model, the machine-learned model configured to concurrently concatenate operation data and the inventory data.

In some embodiments, the forklift sensors include at least one of (i) a forklift control sensor, or (ii) an image sensor.

In some embodiments, the (i) forklift control sensor is configured to capture control data including at least (i) a degree angle of an operation wheel onboard the forklift, or (i) a throttle on board the forklift.

In an aspect, the present disclosure provides an example computer-implemented method. The method may include accessing map data including a dimensional layout of a warehouse environment. The method may include receiving from one or more forklift sensors associated with a forklift, forklift operation data, the forklift operation data indicative of one or more forklift operation behaviors performed during an operation period. The method may include receiving from one or more scanning sensors, inventory data, the inventory data indicative of one or more inventory items scanned during the operation period. The method may include, based at least in part on the map data, forklift operation data, and inventory data, concurrently generating localization data to localize the forklift in the warehouse environment during the operation period.

In some embodiments, the forklift is at least one of (i) an autonomous, (ii) a semi-autonomous forklift, or (iii) a human operated forklift.

In some embodiments, the forklift operation data is generated by a forklift operator, wherein the forklift operator operates the forklift during the operation period.

In some embodiments, the one or more forklift operation behaviors includes at least one of: (i) navigating the forklift through the warehouse environment, (ii) adjusting a vertical position of a mast associated with the forklift, (iii) moving the one on more inventory items from a first location to a second location, or (iv) scanning the one or more inventory items.

In some embodiments, the method includes analyzing the forklift operation behaviors to generate a ground truth dataset, wherein the ground truth dataset is used to train a machine-learned model.

In some embodiments, concurrently generating localization data includes accessing mission data associated with the operation period, wherein the mission data is indicative of an expected locations of the one or more inventory items within the warehouse environment. In some embodiments concurrently generating localization data includes, based on the mission data, concatenating the map data, the forklift operation data, and the inventory data to determine a location and a position of the forklift within the warehouse environment at a time during the operation period.

In an aspect, the present disclosure provides an example non-transitory computer-readable media storing instructions that are executable by one or more processors to perform operations. The operations may include accessing map data including a dimensional layout of a warehouse environment. The operations may include receiving from one or more forklift sensors associated with a forklift, forklift operation data, the forklift operation data indicative of one or more forklift operation behaviors performed during an operation period. The operations may include receiving from one or more scanning sensors, inventory data, the inventory data indicative of one or more inventory items scanned during the operation period. The operations may include, based at least in part on the map data, forklift operation data, and inventory data, concurrently generating localization data to localize the forklift in the warehouse environment during the operation period.

In another aspect, the present disclosure provides an example of a computer-implemented method. The method may include accessing operation data indicative of one or more forklift operation behaviors performed on a forklift during an operation period within a warehouse environment. The method may include generating, based on the operation data, a training dataset for training a machine-learned model, wherein the training dataset includes forklift control data associated with the one or more forklift operation behaviors. The method may include processing the training dataset with at least a portion of the machine-learned model. The method may include updating one or more parameters of the machine-learned model based on labels associated with the operation data.

In some embodiments, the operation data is generated by a plurality of forklift operators over a plurality of operation periods.

In some embodiments, the operation data is accessed from a remote computing system.

In some embodiments, the operation data is captured by one or more sensors on-board the forklift.

In some embodiments, the one or more forklift operation behaviors are associated with one or more forklift controls, the one or more forklift controls including at least one of: (i) a wheel control, (ii) a throttle control, (iii) or a mast control.

In some embodiments, the labels associated with operation data include: (i) forklift acceleration; (ii) forklift jerk; or (iii) forklift turning speed.

In some embodiments, the labels associated with the operation data are binary labels, the binary labels indicative of a positive or a negative operation behavior.

In some embodiments, the method includes segmenting the operation data during the operation period based on one or more discrete actions, the one or more discrete actions associated with the one or more forklift operation behaviors.

Other example aspects of the present disclosure are directed to other systems, methods, vehicles, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

The following describes the technology of this disclosure within the context of a forklift within a warehouse environment for example purposes only. As described herein, the technology described herein is not limited to a forklift and may be implemented for or within other warehouse equipment and other computing systems in one or more other types of environments.

Figure 1:
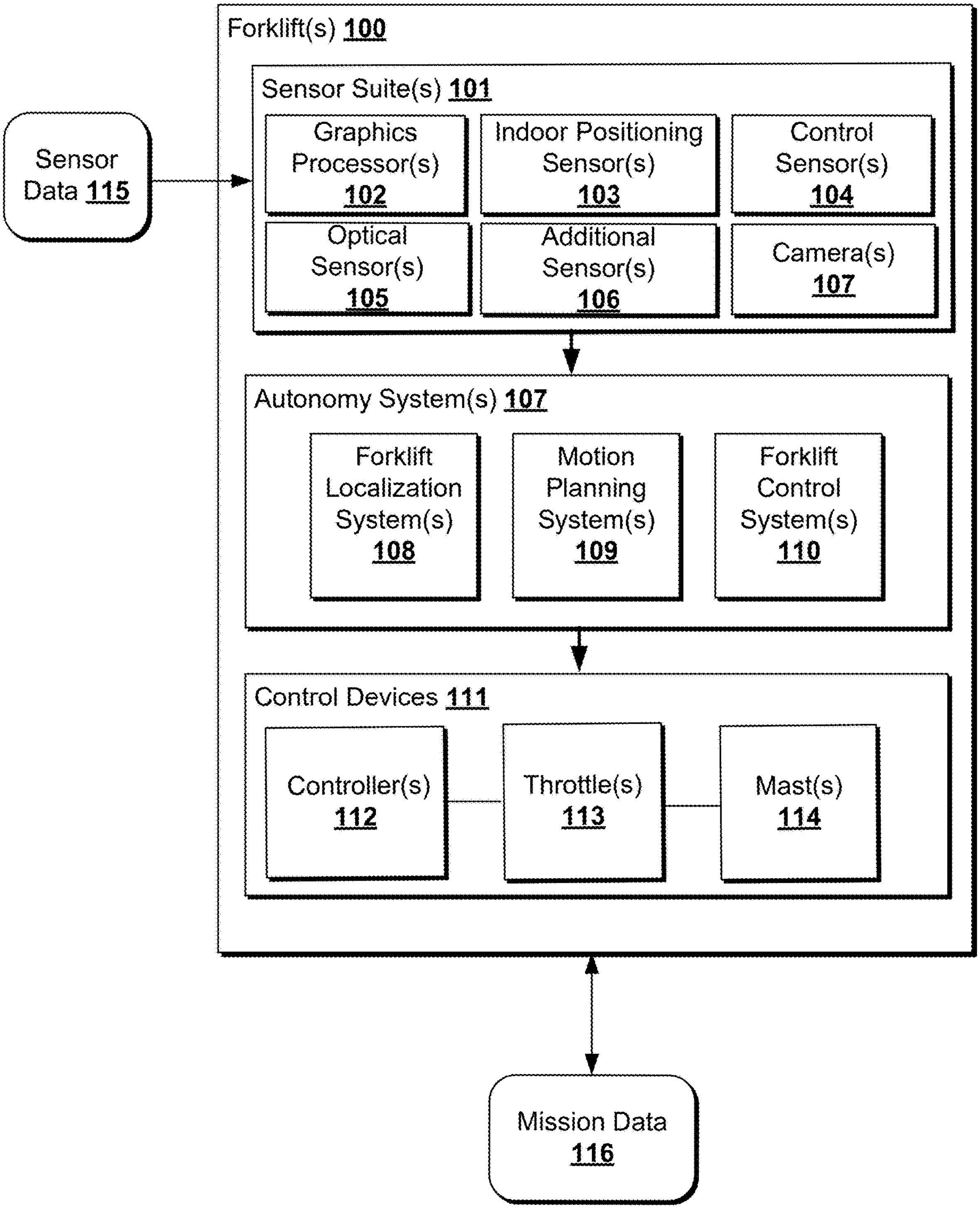
FIG. 1 depicts a block diagram of an example computing system of a forklift, according to some implementations of the present disclosure.

With reference to FIGS. 1-9, example embodiments of the present disclosure are discussed in further detail. FIG. 1 is a block diagram of an example computing system of a forklift according to example implementations of the present disclosure. The example forklift 100 may include a number of subsystems for performing various operations. The subsystems may include a sensor suite 101, autonomy system 107, and control devices 111. The forklift 100 may be any type of forklift such as counterbalance forklifts, pallet trucks, industrial forklifts, walkie stackers, or any other type of warehouse equipment configured to operate within a warehouse environment. For example, the forklift 100 may be a vehicle configured to move warehouse inventory within the warehouse environment. In an embodiment, the forklift may control, be connected to, or be otherwise be associated with implements, attachments, and/or accessories for scanning inventory items within the warehouse environment. In some embodiments, the forklift 100 may be an autonomous or semi-autonomous forklift.

For instance, forklift 100 may include an autonomy system 107 configured to operate the forklift 100 autonomously or semi-autonomously. The autonomy system 107 may be implemented by one or more onboard computing devices. This may include one or more processors and one or more memory devices. The one or more memory devices may store instructions executable by the one or more processors to cause the one or more processors to perform operations or functions associated with the subsystems. The computing resources of the autonomy system 107 may be shared among its subsystems, or a subsystem may have a set of dedicated computing resources.

The example forklift 100 may include a sensor suite 101 which may include different subsystems for performing various sensory operations. The subsystems may include graphics processors 102, indoor positioning sensors 103, control sensors 104 (e.g., forklift controls, etc.), optical sensors 105, cameras 106A (e.g., wide angle cameras, narrow angle cameras, etc.) and additional sensors 106B (e.g., LiDAR, RADAR, laser scanner, photodetector array, etc.).

The graphics processor 102 may perform image processing of captured images; indoor positioning sensors 103 may include a variety of sensors (e.g., camera vision based SLAM positioning system employing one or more monocular cameras, one or more stereoscopic camera, one or more laser depth sensors, one or more LIDAR devices, laser and/or ultrasonic rangefinders, an inertial sensor based positioning system, an RF/WIFI/Bluetooth triangulation based sensor system, or the like).

In some examples, the graphics processor 102 may include a graphics processing unit (GPU). In some examples, the graphics processing unit may include a graphics card (e.g., board that incorporates the graphics processing unit). In some examples, the graphics processor 102 may include CPU/NPUNPU or other types of advanced processors. In some examples, the graphics card may be integrated into a computing system of the forklift 100.

In some examples, the graphics processor 102 may accelerate real-time 3D graphics applications. For example, the graphics processor 102 may accelerate real-time 3D graphics for the machine-learned models of a forklift 100. In some examples, the graphics processor 102 may process sensor data 115 captured by a forklift 100 as it operates throughout a warehouse.

Control sensors 104 may include tactile or other measurement sensors to detect the position and movement of forklift controls while the forklift 100 is in operation. Example control sensors 104 may include steering angle sensors (SAS), throttle position sensor (TPS), inductive sensors (e.g., to detect the speed of the forklift, etc.), accelerometers, or any other type of sensor which may detect the position and movement of a forklift control.

Optical sensors 105 may detect inventory identifiers (e.g., inventory barcodes) and implement optical character recognition (OCR), machine learning, computer vision, or any other image processing algorithm(s)), any combination thereof. In some examples, optical sensors 105 may be electronic detectors that convert or change light into an electric signal. For example, optical sensors 105 may utilize electric signals to identify inventory items through obtaining an image of a barcode. In some examples, optical sensors 105 may be integrated into a camera 106A. In other examples, optical sensors 105 may be a standalone sensor.

Additional sensors 106B may include a variety of sensors (e.g. temperature sensors, gyroscopes, inertial sensors, altitude detectors, LIDAR devices, laser depth sensors, radar/sonar devices, wireless receivers/transceivers, RFID detectors, etc.).

In some embodiments, cameras 106A may include a varied field of view. In some embodiments, a wider field of view camera 106A may observe more of the surrounding environment. In some embodiments, a narrower field of view camera 106A may observe less of the surrounding environment. In other embodiments, the camera lens, focal length, and sensor size may determine the field of view for the camera 106A. In some embodiments, cameras may contain rolling or global shutter image sensors. In some embodiments, cameras may contain rolling or global shutter image sensors. In some embodiments, the field of view for a camera 106A may be static (e.g., does not change). In other embodiments, the field of view for a camera 106A may be dynamic (e.g., may be automatically adjusted). In some embodiments, the cameras 106A may include a 360 degree field of view.

Cameras 106A may collect wide field of view and narrow field of view images for processing. In the example forklift 100, the sensor suite 101 may obtain any sensor data 115 that describes the surrounding warehouse environment of the forklift 100 and any data associated with the operation or control of the forklift 100. The computing resources of the sensor suite 101 may be shared among its subsystems, or a subsystem may have a set of dedicated computing resources.

The example forklift 100 may include an autonomy system 107 which may include different subsystems for performing various autonomy operations. The autonomy operations may include perceiving the surrounding environment of the forklift 100, capturing forklift operation data (e.g., data describing the operation of the forklift 100 as it operates), and planning the forklift's motion through the environment, with or without manual human input. The subsystems of the autonomy system 107 may include a forklift localization system 108, motion planning system 109, and forklift control system 110.

The autonomy system 107 may be implemented by one or more onboard computing devices. This may include one or more processors and one or more memory devices. The one or more memory devices may store instructions executable by the one or more processors to cause the one or more processors to perform operations or functions associated with the subsystems. The computing resources of the autonomy system 107 may be shared among its subsystems, or a subsystem may have a set of dedicated computing resources.

The forklift localization system 108 may determine the location of the forklift 100 within the warehouse environment. In some examples, the forklift localization system 108 of the forklift 100 may pinpoint its exact location within the warehouse environment based on forklift operation data and inventory data (e.g., last scanned inventory item) captured by the forklift 100. In some examples, the forklift localization system 108 may determine the location of the forklift 100 by comparing the forklift operation data and inventory data to map data indicating an expected position and location of the last scanned inventory item within the warehouse environment. An example of the forklift 100 localizing based on operation data and inventory data is further described with reference to FIG. 6.

The motion planning system 109 may determine a motion plan including a forklift behavior and/or a path of travel for the forklift 100. A forklift behavior may include implementing a forklift control (e.g., via the control devices 111) to operate one or more portions of the forklift 100. For instance, the motion planning system 109 may implement a motion plan to raise the mast (e.g., the portion of the forklift that lifts, lowers, and positions the loads manipulated by the forks) to reach the top shelf of an inventory rack. A path of travel may include one or more trajectories that indicate a path for the forklift 100 to follow. A trajectory may be of a certain length or time range. The length of time range may be defined by the computational planning horizon of the motion planning system 109. A trajectory may be defined by one or more waypoints (with associated coordinates). The waypoints may be future locations for the forklift 100. The path of travel may be continuously generated, updated, and considered by the autonomy system 107.

The forklift control system 110 may translate the trajectory into vehicle controls for controlling the forklift 100. For example, the forklift 100 may include control devices 111 which may include different subsystems for performing various forklift control operations. The subsystems may include controllers 112, throttles 113, and a mast 114.

In some examples, the forklift control system 110 may translate the behaviors and trajectory into electrical signals. In some examples, the control devices 111 may receive the electrical signals from the forklift control system 110. The control devices 111 may be configured to implement the translated controls (e.g., electrical signals) from the forklift control system 110. The controller 112 may implement forklift operations to drive the throttle 113 and mast 114. In some examples, the autonomy system 107 may output instructions that may be received by the control devices 111. In some examples, the control devices 111 may translate the instructions into control signals to control the controllers 112, throttle 113, and mast 114.

Mission data 116 may be transferred to and from the forklift 100 with data and instructions for warehouse inventorying. Mission data 116 may be processed by the forklift 100 and its subsystems as input to the forklift 100 for autonomous or semi-autonomous forklift operations and the warehouse inventory management process. The types of information included in mission data 116 and the sources of the mission data 116 are further described herein with reference to FIG. 2.

As further described, the forklift 100 may obtain sensor data 115 through the sensor suite 101 and utilize its autonomy system 107 to detect objects and plan its path of travel to navigate through the warehouse environment. The autonomy system 107 may generate control outputs for controlling the forklift 100 (e.g., through forklift control systems 110, control devices 111, etc.) based on sensor data 115, mission data 116, or other data.

Figure 2:
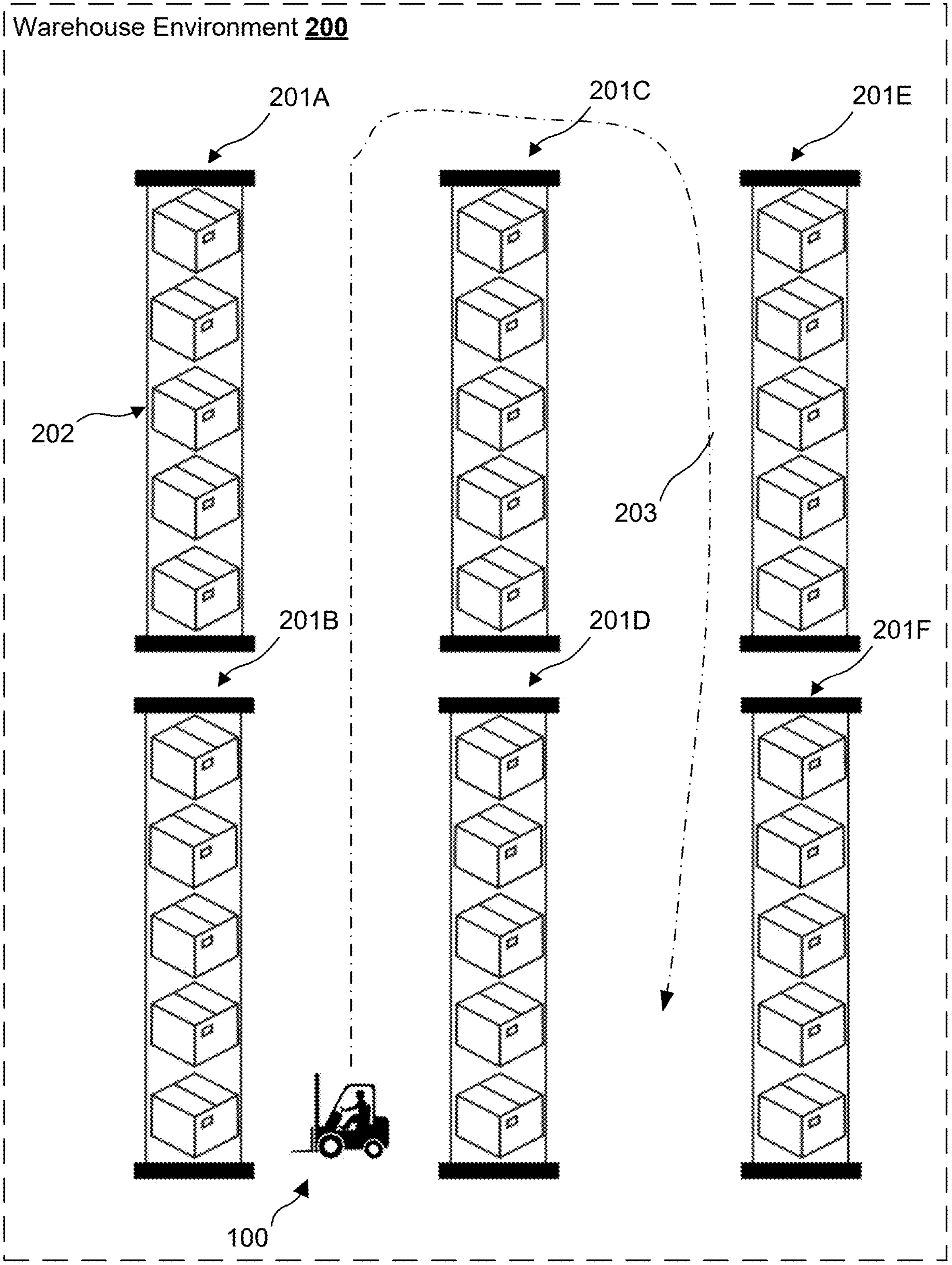
FIG. 2 depicts a representation of an example forklift navigating through a warehouse environment, according to some implementations of the present disclosure.

FIG. 2 depicts a representation of an example forklift navigating through a warehouse environment, according to some implementations of the present disclosure. As further described herein, the forklift 100 may navigate a warehouse environment 200 to scan inventory items 202 autonomously or by a forklift operator. A warehouse environment 200 may be any building or structure where manufactured goods or raw materials may be stored. In some examples, the warehouse environment 200 may include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas suitable for storage of manufactured goods or raw materials (e.g., supply chain port, lumber yards, etc.).

The warehouse environment 200 may include inventory shelving units 201A-F (e.g., inventory storage racks) which store inventory items 202. The inventory shelving units 201A-F may be positioned in a predictable and repeatable pattern throughout the warehouse environment 200. In some examples, the inventory shelving units 201A-F may be positioned in rows. In other examples, the inventory shelving units 201A-F may be positioned adjacent to each other. In some examples the inventory shelving units 201A-F may be stacked on each other. In some examples, the inventory shelving units 201A-F may be positioned to allow for people or forklifts 100 to navigate the warehouse environment 200.

The inventory shelving units 201A-F may be of standard warehouse rack size or of custom size. In some examples, the inventory shelving units 201A-F may be 8-feet, 10-feet, 12-feet, 16-feet, and 20-feet upright. In other examples, the inventory shelving units 201A-F may be of a custom size (e.g., 11-feet, 11.5-feet, etc.). In some examples, the inventory shelving units 201A-F may be based on the measure and height of inventory pallets. In other examples, the inventory shelving units 201A-F may be based on the racking beam size.

The inventory shelving units 201A-F may store warehouse inventory items 202 on its shelves. The inventory items 202 may be any manufactured product or raw material which is being stored in the warehouse environment 200. For example, inventory items 202 may include boxes which contain a manufactured good or raw material. In some examples, inventory items 202 may include other packaged or wrapped (e.g., storage wrapped) items. In some examples, inventory items 202 may include bins or totes that store a manufactured good or raw material. In other examples, inventory items 202 may not be packaged in any box, wrapping or storage material. In some examples, inventory items 202 include an identifier (e.g., barcode).

Inventory items 202 may be stored directly on an inventory shelving unit 201A-F or on pallets. For example, inventory items 202 may be tightly coupled with other similar items and stored on an inventory pallet for easy storage and retrieval. In some examples, inventory pallets may be stored on inventory shelving units 201A-F. In other examples, inventory pallets may be stored on the floor of the warehouse environment 200. For instance, inventory pallets that are stored on the warehouse floor may be identified as an obstacle for a forklift 100. In some examples, inventory pallets stored on the warehouse floor may be captured in a warehouse dimensional layout.

In the example warehouse environment 200, the example forklift 100 may execute a motion plan 203 to navigate the warehouse environment 200. For example, a forklift operator may operate the forklift 100 to navigate through the warehouse environment 200 to complete a mission (e.g., mission data). The manual operation of the forklift 100 by the forklift operator to navigate through the warehouse environment 200 may be based on prior navigation knowledge of the forklift operator, map data provided to the forklift operator indicating a route to complete the mission, or a semi-autonomous operation. For example, the forklift 100 may be autonomous or semi-autonomous forklift. The forklift 100 may receive mission data 116 and utilize its subsystems (e.g., autonomy system 107, control devices 111, etc.) to determine and implement a motion plan 203 to execute the inventory mission. In some embodiments, the motion plan 203 may be determined by the forklift operator based on the mission data 116. In some embodiments, the motion plan 203 may be generated by the forklift 100. In other embodiments, the motion plan 203 may be generated remotely. For instance, the motion plan 203 may be transmitted from a warehouse inventory system.

The motion plan 203 may include forklift operation behaviors to operate one or more forklift controls (e.g., control devices 111). By way of example, mission data 116 may indicate that the forklift 100 is assigned to a mission indicating that two inventory items 202 need to be picked from the second row of inventory shelving unit 201E. Either a forklift operator or the forklift 100 itself may implement a motion plan 203 to navigate from a first location to the inventory shelving unit 201E. For instance, during a semi-autonomous or autonomous mode of operation, the forklift 100 may concurrently localize based on forklift operation data and inventory data. An example of localizing the forklift 100 if further described with reference to FIG. 6.

Once the forklift has reached the inventory shelving unit 201E, the motion plan 203 may include operating one or more control devices 111 to lift the fork (e.g., mast 114) and to the second row of the inventory shelving unit 201E to pick the inventory items 202. The operation behaviors may include the precise pressure applied to the throttle 113, the turning angle of the wheel, etc. needed to maneuver the forklift 100 into position to pick the inventory items 202.

In an embodiment, the motion plan 203 may be iteratively updated as the forklift 100 operates within the warehouse environment 200. For example, the forklift 100 may encounter an obstacle as it executes its inventory mission. In some examples, the forklift 100 may execute active avoidance to avoid the obstacle. Active avoidance may include avoidance maneuvers executed by the forklift 100 to avoid obstacles. In some examples, active avoidance may prevent the forklift 100 from colliding with an object in the warehouse environment 200. In some examples, the forklift 100 may generate an updated motion plan 203 to complete its inventory mission following the avoidance of an obstacle. In some examples, a motion plan 203 may account for known obstacles in the warehouse environment 200.

The motion plan 203 may optimize the travel time and distance for the forklift 100. For instance, the forklift 100 may utilize the motion planning system 109 to generate the most efficient motion plan 203 for the forklift 100 to execute its inventory mission. In some embodiments, the forklift 100 may utilize sensor data 115 perceived by the forklift 100 to determine the most efficient motion plan 203. In some embodiments, the forklift 100 may utilize mission data 116 to determine the most efficient motion plan 203. In some embodiments, the forklift 100 may utilize both sensor data 115 and mission data 116 to generate and optimize the motion plan 203.

As the forklift 100 operates within the warehouse environment 200, forklift operation data may be generated. For instance, operation data generated during an operation period (e.g., by a forklift operator, semi-autonomous, or autonomous forklift) may be used to train a machine-learned model which learns from the forklift operation behaviors, paths of travel, etc. observed during the operation period. An example of training a machine-learned model using forklift operation data is further described with reference to FIG. 8.

As further described herein, the forklift 100 may traverse the warehouse environment 200 to scan inventory items 202 stored on inventory shelving units 201A-F by executing a motion plan 203. In some examples, multiple forklifts 100 may traverse the warehouse environment 200 by executing respective motion plans 203 simultaneously.

Figures 3A, 3B:
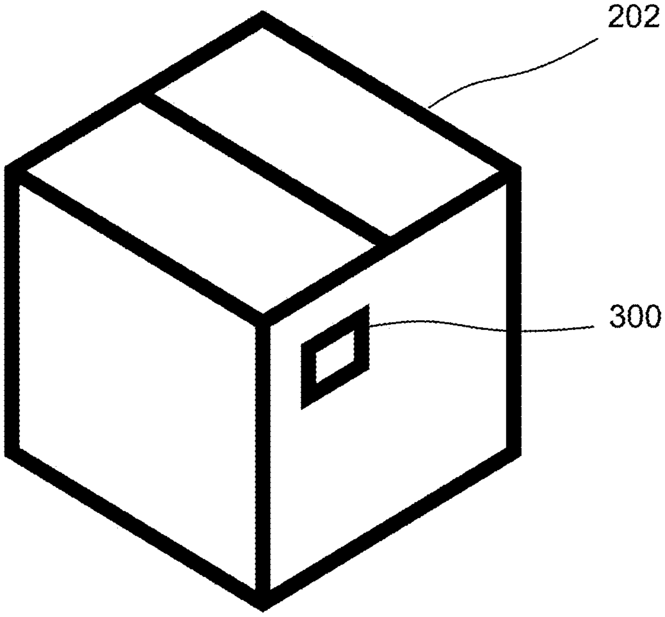
FIG. 3A depicts a representation of an example inventory item, according to some implementations of the present disclosure.
FIG. 3B depicts a representation of an example inventory barcode, according to some implementations of the present disclosure.

FIG. 3A is a representation of an example inventory item, according to some implementations of the present disclosure. An inventory items 202 may be any manufactured product or raw material which is being stored in the warehouse environment 200. For example, inventory items 202 may include boxes which contain a manufactured good or raw material. In some examples, inventory items 202 may include other packaged or wrapped (e.g., storage wrapped) items. In some examples inventory items 202 may include bins or totes that store a manufactured good or raw material. In other embodiments, inventory items 202 may not be packaged in any box, wrapping or storage material. In some embodiments, inventory items 202 include an inventory barcode 300.

FIG. 3B is a representation of an example identifier such as an inventory barcode, according to some implementations of the present disclosure. An inventory barcode 300 may include any type of linear bar code or two dimensional matrix bar code. In some examples, an inventory barcode 300 may include a QR (Quick Response) code. For instance, an inventory barcode 300 may include a QR Code model 1 or model 2, Micro QR Code, iQR Code. SQRC Code, FrameQR, HCC2D Code etc. In some examples, inventory bar codes may include RFID (Radio-frequency identification) tags. For instance, the forklift 100, may utilize the sensor suite 101 to obtain sensor data 115 that includes radio frequencies to automatically identify, and track RFID tags attached to the inventory items 202. The RFID tags may include passive tags or active tags and become identifiable by emitting low, high, or ultrahigh frequencies. An inventory barcode 300 may include any means which identifies an inventory item within a warehouse environment 200 including, but not limited to handwritten or printed text readable by cameras or OCR (optical character recognition), NFC (near field communication), etc. An inventory barcode may also include inventory information such as dimension data captured by the sensors or machine-learned algorithms to detect damage or recognize or count objects.

Figure 4:
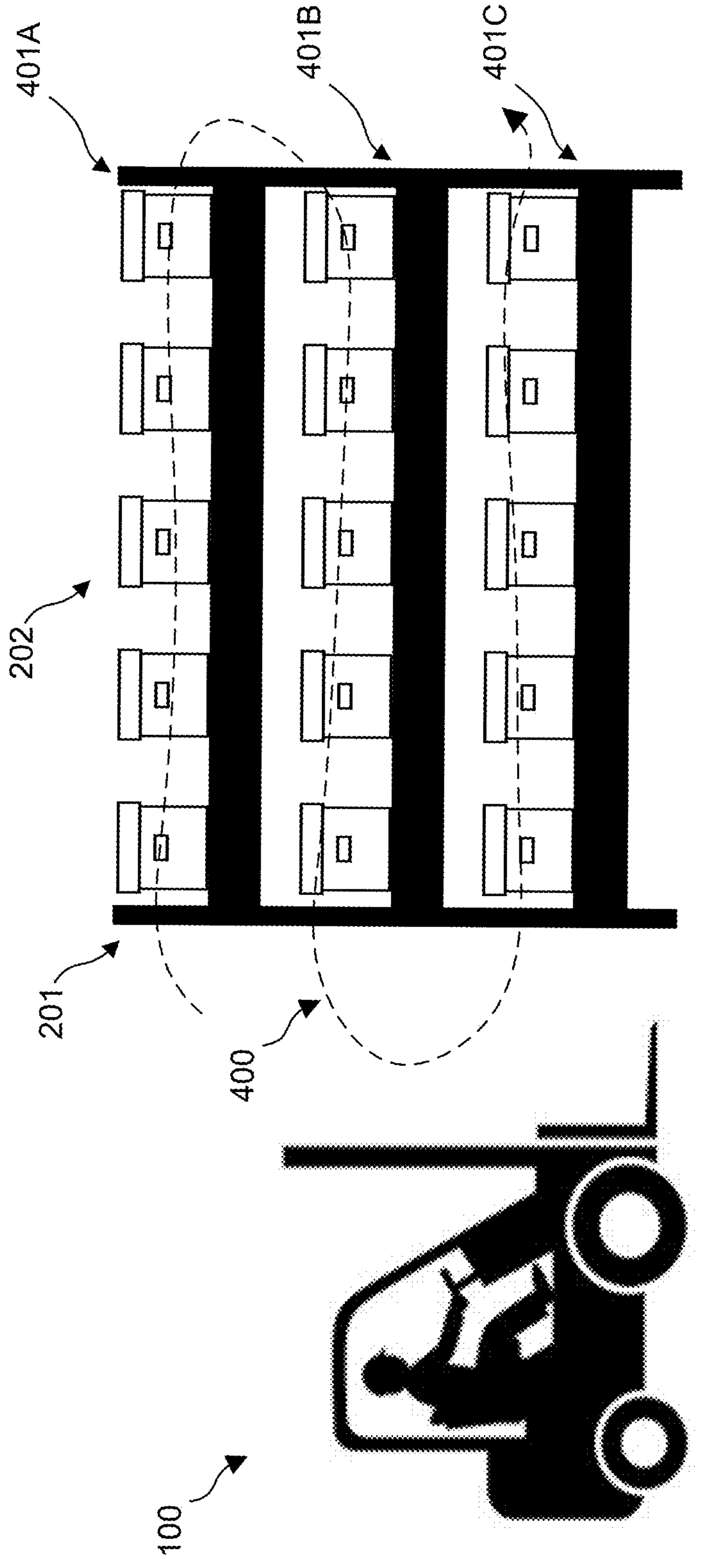
FIG. 4 depicts a representation of an example forklift operation, according to some implementations of the present disclosure.

FIG. 4 depicts a representation of an example forklift operation, according to some implementations of the present disclosure. As further described herein, a forklift 100 may scan inventory barcodes 300 located on inventory items 202 that are stored on inventory shelving units 201. In some embodiments, the forklift 100 may execute an inventory scanning motion plan 400 to scan the inventory barcodes 300 located on the inventory items 202 on each shelf 401A-C of an inventory shelving unit 301.

The inventory scanning motion plan 400 may be generated or implemented manually (e.g., by a forklift operator) or by the forklift 100. For instance, the inventory scanning motion plan 400 may be generated by the motion planning system 109 of the forklift 100. In some embodiments, the inventory scanning motion plan 400 may be indicative of mission data 116 which includes inventory items 202 to be scanned by the forklift 100. As such, the inventory scanning motion plan 400 may be generated by utilizing sensor data 115 captured by the sensor suite 101 of the forklift 100 to identify the correct inventory shelving unit 201 that is storing the respective inventory items 202 and navigating to a correct shelf 401A-C of the inventory shelving unit 201 where the forklift 100 may scan a barcode 300 on the inventory item 202.

In some embodiments, the inventory scanning motion plan 400 may direct the forklift 100 to operate the mast 114 at particular height or distance (e.g., within 24 inches from the barcode) while scanning inventory barcodes 300 on inventory items 202 located on the same shelf 401A-C. For example, the forklift 100 may utilize the control devices 111 to control the mast 114 to reach a height of 8 feet above the warehouse environment floor to scan inventory barcodes 300 on inventory items 202 located on the top shelf 401A of the inventory shelving unit 201. In some embodiments, the forklift 100 may operate the mast 114 at a lower height such as 5 feet above the warehouse environment floor to scan inventory barcodes 300 on inventory items 202 located on a lower shelves 401B-C on the inventory shelving unit 201. The forklift 100 may utilize the cameras 106A of the sensor suite 101 to determine the appropriate height of the mast 114 to engage the fork or scan the barcode 300. For example, the forklift 100 may include a downward facing camera 106A that measures to height of the mast 114 from the nearest surface.

The forklift 100 may execute the inventory scanning motion plan 400 autonomously or semi-autonomously by utilizing its subsystems. For example, the forklift 100 may obtain sensor data 115 that indicates the forklift 100 located a target inventory shelving unit 201. In some embodiments the cameras 106A of the sensor suite 101 may utilize a camera 106A to capture wide view images (e.g., 360 degree, etc.) of the inventory shelving unit 201. In some embodiments, the cameras 106A of the sensor suite 101 may utilize a narrow view image to locate inventory barcodes 300 which need to be scanned by the forklift 100. In some embodiments, wide view images may be utilized to scan inventory barcodes 300 by analyzing multiple barcodes included in the wide view image. In some embodiments, the forklift 100 may utilize the indoor positioning sensors 103, graphics processors 102, optical sensors 105, additional sensors 106B, and cameras 106A to execute the inventory scanning motion plan 400.

A forklift operator may manually operate the forklift 100 to execute the inventory scanning motion plan. For instance, the forklift operator may manually engage the control devices 111 to maneuver the forklift 100 to scan the inventory bar codes 300 on the respective shelves 401A-C of the inventory shelving unit 201.

In some embodiments, the sensor suite 101 may capture forklift operations data while the forklift is executing the inventory scanning motion plan 400 (e.g., operation period). The sensor suite 101 may also capture inventory data based on scanning the inventory items 202. In an embodiment, the forklift operations data may be used to train a machine-learned model to operate the forklift 100 autonomously or semi-autonomously. In some embodiment, the forklift operations data and inventory data may be used to localize the forklift 100 within the warehouse environment 200. An example of training a machine-learned model using forklift operations data is further described with reference to FIG. 8. An example of utilizing forklift operations data and inventory data to localize the forklift 100 is further described with reference to FIG. 6.

Figure 5:
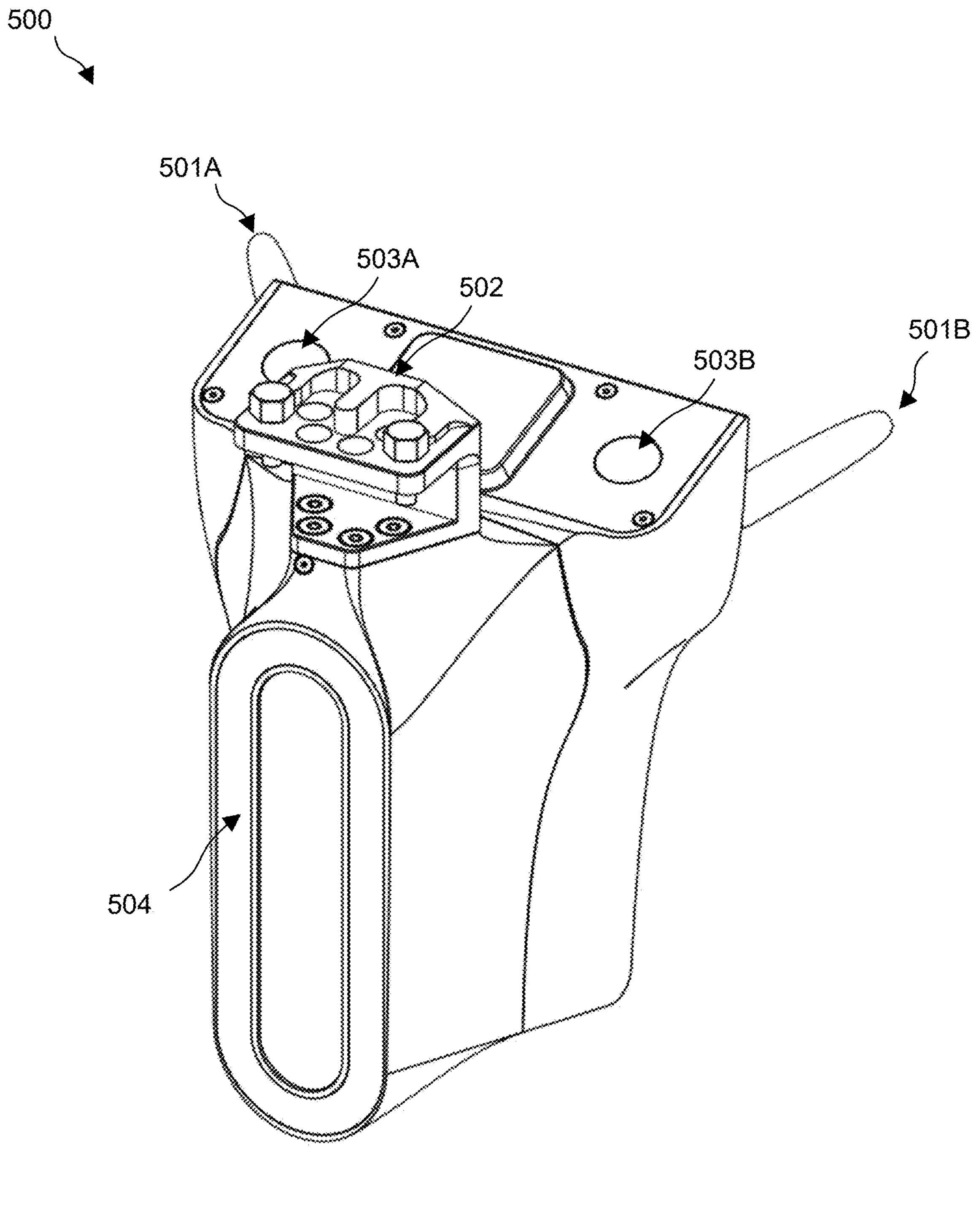
FIG. 5 depicts a representation of an example forklift sensor, according to some implementations of the present disclosure.

FIG. 5 depicts a representation of an example forklift sensor, according to some implementations of the present disclosure. The example forklift sensor 500 may include one or more processors and one or more memory devices. The one or more memory devices may store instructions executable by the one or more processors to cause the one or more processors to perform operations or functions.

For example, the forklift sensor 500 may include antennas 501A-B that allow the forklift sensor 500 to communicate with one or more other systems or devices, including systems or devices that are onboard or remotely located from the forklift 100. The communication antennas 501A-B may include any circuits, components, software, etc. for communicating with one or more networks (e.g., internet, wireless local area network (WLAN), wireless wide area network (WWAN), near-field communication, LTE/5G, other shorter distance communication protocols, etc.). In some implementations, the antennas 501A-B may include, for example, one or more of a communications controller, receiver, transceiver, transmitter, port, conductors, software or hardware for communicating data (e.g., forklift operations data, inventory data, sensor data 115, etc.)

The forklift sensor 500 may include a camera array 504 for capturing image data up to 360 degrees. For instance, the camera array 504 may capture sensor data 115 (e.g., images, short clips, etc.) of the forklift operating within the warehouse environment 200. For instance, the forklift sensor 500 may be installed on an exterior surface of the forklift 100 to capture sensor data 115 including forklift operations data and inventory data.

For example, the forklift sensor 500 may include a clamp 502 allowing the forklift sensor 500 to be installed on an exterior surface of the forklift. By way of example, the clamp 502 may secure the forklift sensor 500 to a backrest of the forklift. In other embodiments, the clamp 502 may secure the forklift sensor 500 to the overhead guard, mast, fuel tank, engine compartment, or any other exterior surface of the forklift 100.

In an embodiment, the forklift sensor 500 may include scanning sensors 503A-B to scan barcodes 300 of inventory items 202. The scanning sensors 503A-B may include any type of device capable of detecting a barcode 300 and identifying an inventory item 202 based on the barcode. While examples, herein describe the forklift sensor 500 as including antennas 501A-B, camera arrays 504, a clamp 502, and scanning sensors 503A-B, the present disclosure is not limited to such embodiment and the forklift sensor 500 may include additional or fewer elements. For instance, a forklift 100 may additionally include tactile sensors or other measurement sensors to detect the position and movement of forklift controls while the forklift 100 is in operation. In some embodiments, a forklift 100 may include a plurality or a suite of forklift sensors 500 where each is configured to capture a single type of sensor data (e.g., image data, tactile data, inventory data, etc.).

The sensor data captured by the forklift sensor 500 or plurality of forklift sensors 500 may be used to localize the forklift 100 within the warehouse environment 200. An example of using sensor data 115 captured by forklift sensors 500 to localize the forklift is further described with reference to FIG. 6.

Figure 6:
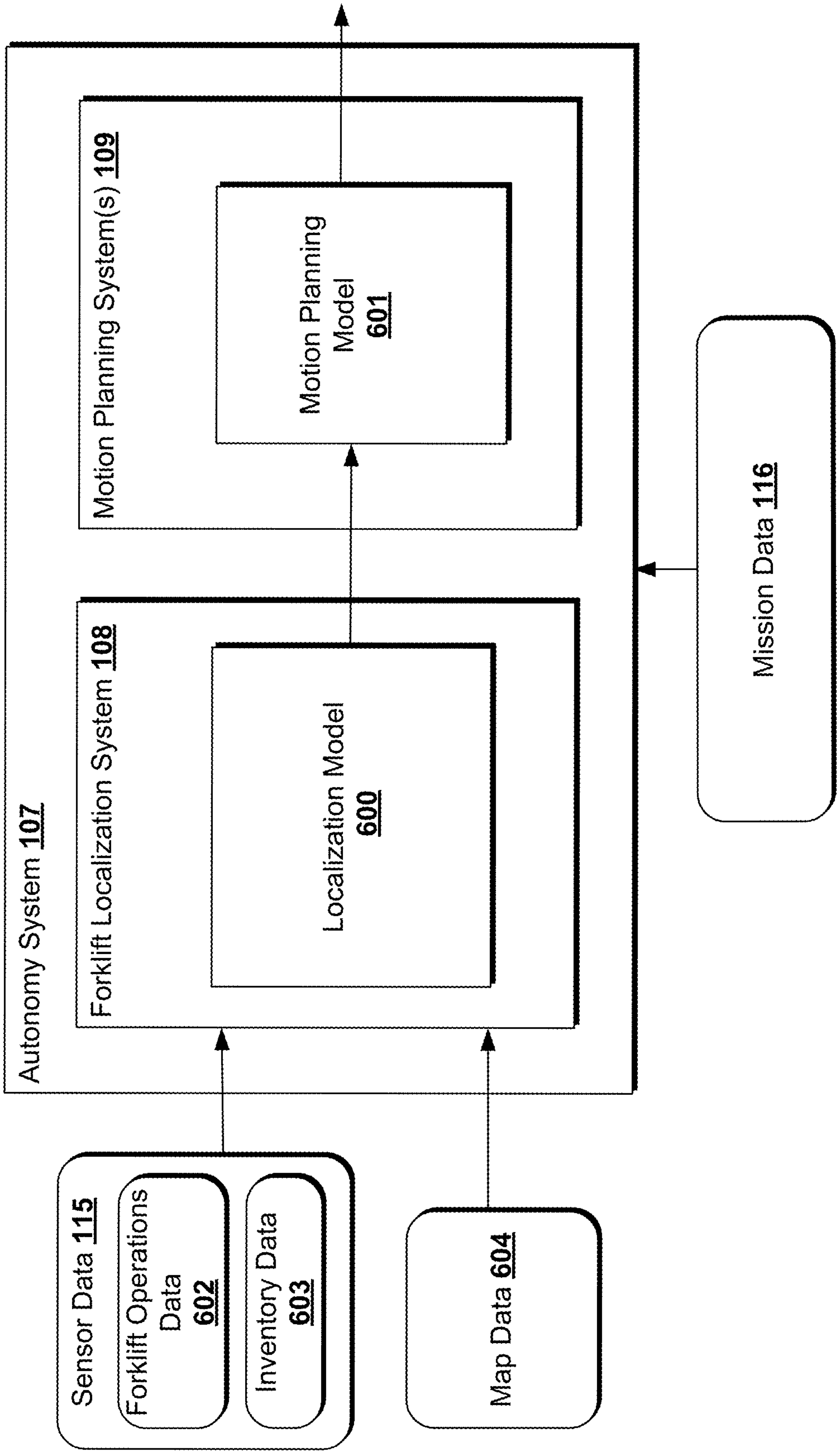
FIG. 6 depicts an example dataflow pipeline, according to some implementations of the present disclosure.

FIG. 6 depicts an example dataflow pipeline, according to some implementations of the present disclosure. The example dataflow pipeline depicts an example implementation in which an autonomy system 107 onboard or remote from a forklift 100 accesses map data 604, forklift operations data 602, and inventory data 603 within sensor data 115 to generate localization data to localize the forklift 100 within a warehouse environment 200. In an embodiment, the localization data and mission data 116 may be used to generate a motion plan for the forklift 100 using a motion planning model 601 within the motion planning system 109.

The forklift localization system 108 and motion planning system 109 may be included, for example, within the autonomy system 107 of the forklift 100 or remotely (e.g., within a remote computing system). Although FIG. 6 illustrates an example implementation of a forklift localization system 108 and motion planning system 109 having various components, it is to be understood that the components may be rearranged, combined, omitted, etc. within the scope of and consistent with the present disclosure.

The forklift localization system 108 may include a trained localization model 600. The localization model 600 may include one or more machine-learned models trained to localize the forklift 100 within in the warehouse environment 200. The localization model 600 may be or otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, transformer-based architecture, or other forms of neural networks.

The localization model 600 may be trained through the use of one or more model trainers and training data. The model trainers may be trained using one or more training or learning algorithms. One example training technique is backwards propagation of errors. In some embodiments, simulations may be implemented for obtaining the training data or for implementing the model trainer(s) for training or testing the model(s). In some embodiments, the model trainer(s) may perform supervised training techniques using labeled training data. As further described herein, the training data may include labelled operations data that have labels indicating a type of operations behavior. The training dataset may also include the image or LIDAR data collected of the environment. In some embodiments, the training data may include labelled inventory data that have labels indicating a specific shelf or inventory shelving unit where the inventory was scanned. In other embodiments, the training data may include simulated training data (e.g., training data obtained from simulated scenarios, inputs, configurations, warehouse environments, etc.).

Additionally, or alternatively, the model trainer(s) may perform unsupervised training techniques using unlabeled training data. By way of example, the model trainer(s) may train one or more components of a machine-learned model to perform localization through unsupervised training techniques using an objective function (e.g., costs, rewards, heuristics, constraints, etc.). In some implementations, the model trainer(s) may perform a number of generalization techniques to improve the generalization capability of the model(s) being trained. Generalization techniques include weight decays, dropouts, or other techniques.

The localization model 600 may obtain sensor data 115 including forklift operations data 602 and inventory data 603 from the sensor suite 101. In some embodiments, the localization model 600 may be trained to generate localization data by analyzing the sensor data 115. An example of the localization model 600 utilizing sensor data 115 to further train is further described with reference to FIG. 8.

The localization model 600 may process forklift operations data 602, inventory data 603, and map data concurrently to generate localization data during an operation period. The operation period may include a duration of time in which the forklift 100 is in operation. In some embodiments, the operation period may be associated with mission data 116. For instance, a forklift 100 may be assigned to complete a mission based on mission data 116. As the forklift begins operation to complete the mission (e.g., satisfy the mission data 116), an operation period may begin. Once the forklift 100 has completed the mission and is no longer in operation, the operation period may end. Sensor data 115 including forklift operations data 602 and inventory data 603 captured during the operation period may be used to train the localization model 600 and/or the motion planning model 601 to operate in an autonomous or semi-autonomous mode. An example of utilizing sensor data 115 including forklift operations data 602 and inventory data 603 captured during the operation period for training purposes is further described with reference to FIG. 8.

The localization model 600 may continuously localize the forklift 100 in the warehouse environment 200 by utilizing the forklift operations data 602 to determine the position and movement of the forklift and the utilizing inventory data 603 (e.g., last scanned inventory item) to approximate location of the forklift 100 based on where the last scanned inventory item was located. By way of example, the localization model 600 may concatenate the forklift operations data 602 and inventory data 603 based on a time (e.g., time stamp) when the data was captured. For instance, the forklift operations data 602 may indicate three minutes into the operation period that the wheel control of the forklift 100 was turned at a 75 degree angle and the fork attached to the mast was extended and occupied by a pallet (e.g., storing an inventory item 202). Inventory data 603 may indicate that the inventory item 202 was also scanned approximately three minutes into the operation period. Based on the common time stamp of three minutes, the localization model 600 may concatenate the operation behavior (e.g., wheel degree angle, extended fork, etc.) and the scanned inventory item 204 (e.g., inventory data 603).

In an embodiment, the sensor data 115 may also indicate the location at which the inventory item 202 was scanned. For instance, image data may depict one or more identifiers associated with the scanned location of the scanned inventory item 202. In an embodiment, the localization model 600 may compare the scanned location (e.g., based on inventory data 603) to mission data 116. For instance, mission data 116 may indicate the expected location of each inventory item 202 assigned to the forklift 100 during the operation period and inventory data 603 may indicate the actual location of the inventory item 202. In the event that the expected location and the actual location do not match, the localization model 600 may utilize the actual location (e.g., based on the inventory data 603) to generate localization data. In the event that the expected location and the actual location match, the localization model 600 may improve its confidence in the generation of localization data.

For instance, the localization model 600 may concatenate the forklift operations data 602 and inventory data 603 to determine the approximate location and position of the forklift 100. In an embodiment, the localization model 600 may compare the location and position of the forklift to map data 604 to localize the forklift within the warehouse environment 200. For example, map data 604 may include a dimensional mapping of the warehouse environment 200.

By way of example, map data 604 may include a dimensional layout. The dimensional layout may be a 2D, 3D, or 4D (e.g., changes in 3D layout over time) mapping of the warehouse environment 200 which includes the dimensions of the warehouse environment 200 itself, dimension of warehouse infrastructure (e.g., inventory shelving units 201A-F), locations of warehouse infrastructure, and positional information such as entry ways or exits.

In some embodiments, the dimensional layout may include positional points which indicate positions within the warehouse environment 200. For example, a dimensional layout may include inventory shelving units 201A-F which indicate inventory shelving units 201A-F in the warehouse environment 200. In some embodiments, the dimensional layout may include entry ways or exits which indicate entry ways or exits in the warehouse environment 200. In other examples, warehouse equipment or machinery may be indicated on a dimensional layout which indicate warehouse equipment or machinery such as other forklifts 100 in the warehouse environment 200.

In some embodiments, the dimensional layout may be included in mission data 116 which is transmitted from a warehouse computing system. In some embodiments, the dimensional layout may be stored on the forklift 100. In other examples, the dimensional layout may be updated by the forklift 100 and transmitted to the warehouse computing system. In some embodiments, the dimensional layout may be updated manually when the layout of the warehouse environment 200 changes. For example, if an inventory shelving unit 201A-F unit is added or moved within the warehouse environment 200, the dimensional layout may be updated to reflect the change.

The map data 604 including the dimensional layout may be generated manually or automatically. In some embodiments, the dimensional layout may be generated by manually mapping the layout of the warehouse environment 200 using LiDAR and camera sensors. In some embodiments, the dimensional layout may be generated by manually flying a drone throughout the warehouse environment 200. In some embodiments, the dimensional layout may be generated by processing a facility map of the warehouse environment 200 which includes dimensional measurements of the warehouse environment 200 and warehouse infrastructure (e.g., inventory shelving units 201A-F).

The localization model 600 may utilize the concatenated forklift operations data 602 and inventory data 603 at a timestamp to localize the forklift 100 by comparing the approximate position and location of the forklift (e.g., as indicated by the sensor data 115) to a position or location on the dimensional layout. As such the localization model 600 may be able to pinpoint the exact location (e.g., within a percent confidence, error, etc.) of the forklift 100 within the warehouse environment 200 without using traditional tracking technologies (e.g., GPS, etc.).

In an embodiment, the localization model 600 may concurrently generate localization data based on the map data 604, the forklift operations data 602, and the inventory data 603 throughout the operation period. For instance, as the forklift continuously generates forklift operations data 602 by performing operations the localization model 600 may concurrently generate localization data between inventory scans (e.g., receiving inventory data 603). By way of example, forklift operations data 602 may indicate that the forklift is preparing to disengage a pallet after storing an inventory item 202 that was just scanned (e.g., based on inventory data 603) at a seven minute time stamp during the operation period. Based on localization data indicating that the forklift is near a first inventory shelving unit 201A at the seven minute time stamp, and mission data 116 indicating that the forklift 100 is assigned to pick an inventory item 202 from a second inventory shelving unit 201B, the localization model 600 may localize the forklift 100 to be at an approximate position between the first inventory shelving unit 201A and the second inventory shelving unit 201B.

In an embodiment, the localization model 600 may also analyze forklift operations data 602 such as the acceleration or speed the forklift 100 is traveling between the first inventory shelving unit 201A and the second inventory shelving unit 201B. As such the localization model 600 may more accurately localize the forklift 100 concurrently upon receiving the forklift operations data 602 in between inventory scans. Once inventory data 603 associated with the subsequent inventory item is captured, the localization model 600 may concurrently locate the forklift 100 based on the forklift operations data 602, inventory data 603, and map data associated with the common time stamp.

The localization model 600 may generate localization data indicating the position and location of the forklift 100 within the warehouse environment 200 and the motion planning model 601 may utilize the localization data to generate motion planning data. For instance, the localization model 600 may provide the localization data (e.g., indicative of the position and location of the forklift 100) to the motion planning system 109 as input data to generate motion plans.

The motion planning system 109 may include a trained motion planning model 801 which may be configured to determine how the forklift 100 is to interact and traverse the warehouse environment 200. The motion planning model 801 may include one or more machine-learned models trained to determine one or more motion plans 203 for the forklift 100. The motion planning model 801 may be or otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), transformer-based architectures, convolutional neural networks, or other forms of neural networks.

The motion planning model 801 may be trained through the use of one or more model trainers and training data. The model trainers may be trained using one or more training or learning algorithms. One example training technique is backwards propagation of errors. In some embodiments, simulations may be implemented for obtaining the training data or for implementing the model trainer(s) for training or testing the model(s). In some embodiments, the model trainer(s) may perform supervised training techniques simulated training data. As further described herein, the training data may include a real-world warehouse environment 200 or a simulated warehouse environment 200. The training dataset may also include the image or LIDAR data collected of the environment. In some embodiments, the simulated training data may include training data obtained from simulated scenarios, inputs, configurations, mock warehouse environments, etc.).

The motion planning model 801 may determine one or more motion plans for an autonomous or semi-autonomous forklift 100. As described a motion plan 203 may include one or more trajectories that indicate a path for the forklift 100 to follow. A trajectory may be of a certain length or time range. The length or time range may be defined by the computational planning horizon of the motion planning system 109. A trajectory may be defined by one or more waypoints (with associated coordinates). The way points(s) may be future locations(s) for the forklift 100. The motion plans 203 may be continuously generated, updated, and considered by the autonomy system 107. The motion plan 203 may also include forklift operation behaviors to operate one or more forklift controls (e.g., control devices 111) such as operation of the mast, fork, etc. to execute an inventory scanning motion plan 400.

The motion planning model 801 may receive as input, localization data and mission data 116 to generate motion plans (e.g., motion plan 203, inventory scanning motion plan 400, etc.) for the forklift 100. For example, the mission data 116 may indicate the inventory items 202 assigned to the forklift 100 during the operation period. The mission data 116 also indicate the expected location (e.g., specific shelf, inventory shelving unit 201A-F, etc.) of the inventory item 202. Based on the localization data indicating the current position and location of the forklift 100 (e.g., relative to the dimensional layout) the motion planning model 601 may generate a motion plan including a trajectory that will lead the forklift 100 to the location of the inventory items 202 indicated by the mission data.

The motion plan may include operation behaviors that adjust the position of the forklift 100 or its components (e.g., mast fork, etc.) such that the forklift 100 is able to follow a trajectory to the inventory items 202. The trajectory may be developed such that the waypoints may avoid interference with any detected objects or objects (e.g., warehouse infrastructure) encoded in the map data 604. For instance, the trajectory may be encoded with speed, altitude, acceleration, yaw, or other operational parameters (e.g. operation behaviors) for traveling in accordance with the waypoints and avoiding objects within the warehouse environment 200 while travelling to a destination location.

In some embodiments, the motion planning model 801 may utilize mission data 116 to determine an updated motion plan 203. For example, if mission data 116 indicates that an inventory items 202 is to be located at a specific location and the forklift 100 is unable to locate the inventory items 202 at the specific location, the motion planning model 801 may generate an updated motion plan 203 to rescan the missed inventory items 202. In some embodiments, the motion planning model 801 may generate a new motion plan 203 to avoid an obstacle which increases travel distance for the forklift 100. In other examples, the motion planning model 801 may generate modified motion plans to locate misslotted inventory items 202.

The localization model 600 and the motion planning model 801 may utilize the localization data, map data 604, and mission data 116 to generate a motion plan 203 to traverse the warehouse environment 200.

Figure 7:
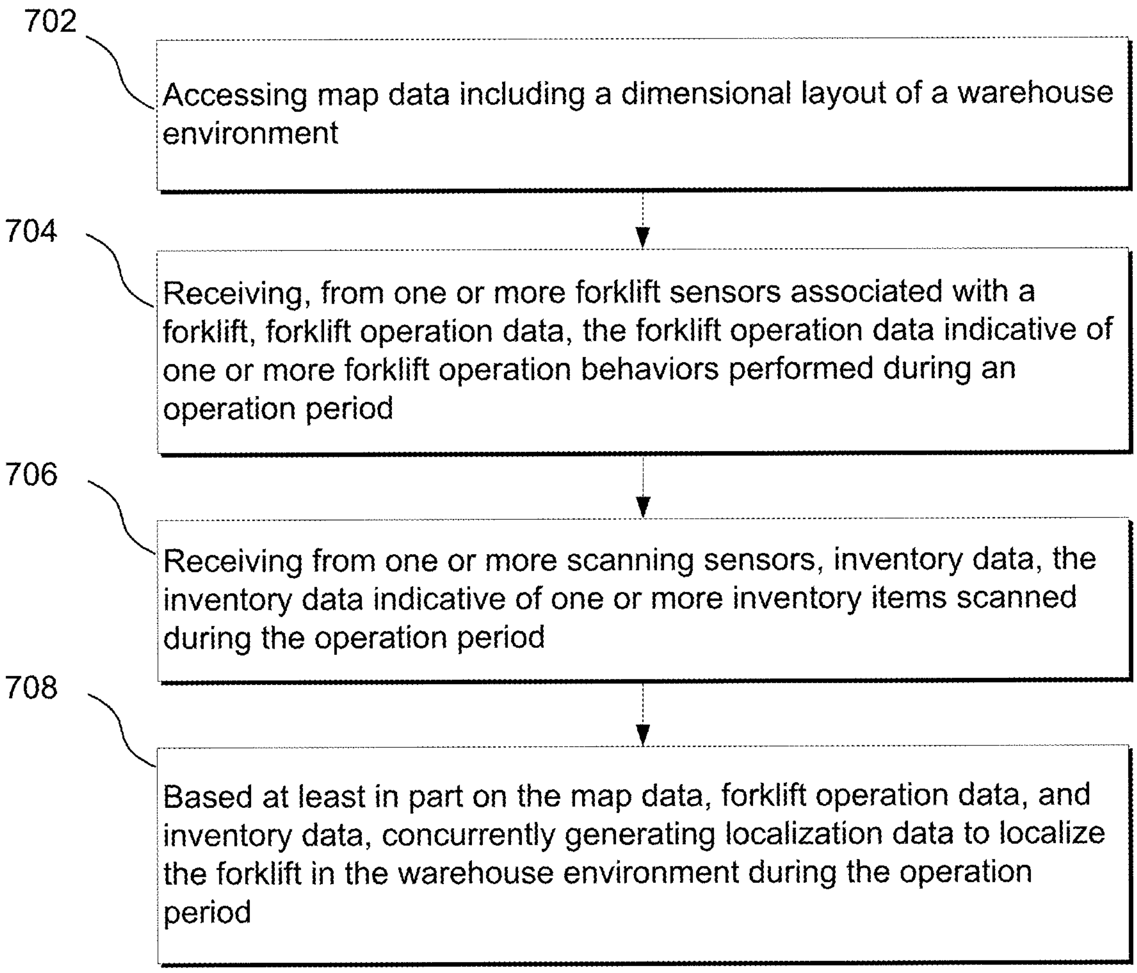
FIG. 7 depicts a flow chart of an example method, according to some implementations of the present disclosure.

FIG. 7 depicts a flow chart of an example method, according to some implementations of the present disclosure. One or more portion(s) of the method 700 may be implemented by a computing system that includes one or more computing devices such as, for example, the computing systems described with reference to the other figures (e.g., forklift 100, autonomy system 107, remote system(s), a system of FIGS. 1-6, etc.). Each respective portion of the method 700 may be performed by any (or any combination) of one or more computing devices. Moreover, one or more portion(s) of the method 700 may be implemented on the hardware components of the device(s) described herein (e.g., as in FIGS. 1-6, etc.), for example, to localize a forklift 100 and generate a motion plan 203 with respect to the same.

FIG. 7 depicts elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 may be performed additionally, or alternatively, by other systems.

At 702 the method 700 may include accessing map data including a dimensional layout of a warehouse environment. For instance, the localization model 600 may access map data 604 including a dimensional layout representative of the a warehouse environment 200 where one or more forklift 100 operate. The dimensional layout may include positional points which indicate positions within the warehouse environment 200. For example, a dimensional layout may include inventory shelving units 201A-F which indicate inventory shelving units 201A-F in the warehouse environment 200. In some embodiments, the dimensional layout may include entry ways or exits which indicate entry ways or exits in the warehouse environment 200. In other examples, warehouse equipment or machinery may be indicated on a dimensional layout which indicate warehouse equipment or machinery such as other forklifts 100 in the warehouse environment 200. The map data 604 may be used to correlate a position and location of a forklift 100.

At 704 the method may include receiving from one or more forklift sensors associated with a forklift, forklift operation data, the forklift operation data indicative of one or more forklift operation behaviors performed during an operation period. For instance, a forklift 100 may be assigned to move eight inventory items 202 from one location to another within the warehouse environment 200. As the forklift 100 begins to operate to move the eight inventory items 202, an operation period may begin.

In an embodiment, the forklift 100 may include one or more forklift sensors configured to observe the forklift as it operates within the warehouse environment 200. The forklift sensors may capture control data (e.g., forklift control data), image data, and other sensor data (e.g., audio, LIDAR, etc.). The forklift operations data 602 may depict the movement or operation of the controls (e.g., wheel, throttle, etc.) as they are used during operation of the forklift 100.

At 706 the method may include receiving from one or more scanning sensors, inventory data, the inventory data indicative of one or more inventory items scanned during the operation period. For instance, as the forklift 100 operates within the warehouse environment 200, scanning sensors may scan inventory items 202 and acquire inventory data 603. By way of example, the forklift 100 may scan inventory items 202 in (e.g., to store at a particular location) or out (e.g., to move to a new location).

At 708 the method may include, based at least in part on the map data, operation data, and inventory data, concurrently generating localization data to localize the forklift in the warehouse environment during the operation period. For instance, a localization model 600 running on-board or remotely from the forklift 100 may concurrently generate localization data based on the map data 604, the forklift operations data 602, and the inventory data 603 throughout the operation period.

As the forklift begins operation to complete the mission (e.g., to move the eight inventory items 202), the localization model 600 may continuously localize the forklift 100 in the warehouse environment 200 by utilizing the forklift operations data 602 to determine the position and movement of the forklift and the utilizing inventory data 603 (e.g., last scanned inventory item) to approximate location of the forklift 100 based on where the last scanned inventory item was located.

By way of example, the localization model 600 may concatenate the forklift operations data 602 and inventory data 603 based on a time (e.g., time stamp) when the data was captured. For instance, the forklift operations data 602 may indicate twelve minutes into the operation period that the wheel control of the forklift 100 was turned at a 15 degree angle and the fork attached to the mast was retracted and occupied by a pallet (e.g., storing the third inventory item 202). Inventory data 603 may indicate that the third inventory item 202 was also scanned approximately twelve minutes into the operation period. Based on the common time stamp of twelve minutes, the localization model 600 may concatenate the operation behavior (e.g., wheel degree angle, extended fork, etc.) and the third scanned inventory item (e.g., inventory data 603).

The localization model 600 may compare the position (e.g., as indicated by the forklift operations data 602) and the location of the third scanned inventory item (e.g., as indicated by the inventory data 603) and associate the position and location to a position and location on the dimensional layout. For instance, the localization model 600 may correlate the position and location to 2D, 3D, 4D, etc. coordinates on the dimensional layout generating precise localization data. The localization data may be used to generate a motion plan for an autonomous or semi-autonomous mode of operations of the forklift 100.

Figure 8:
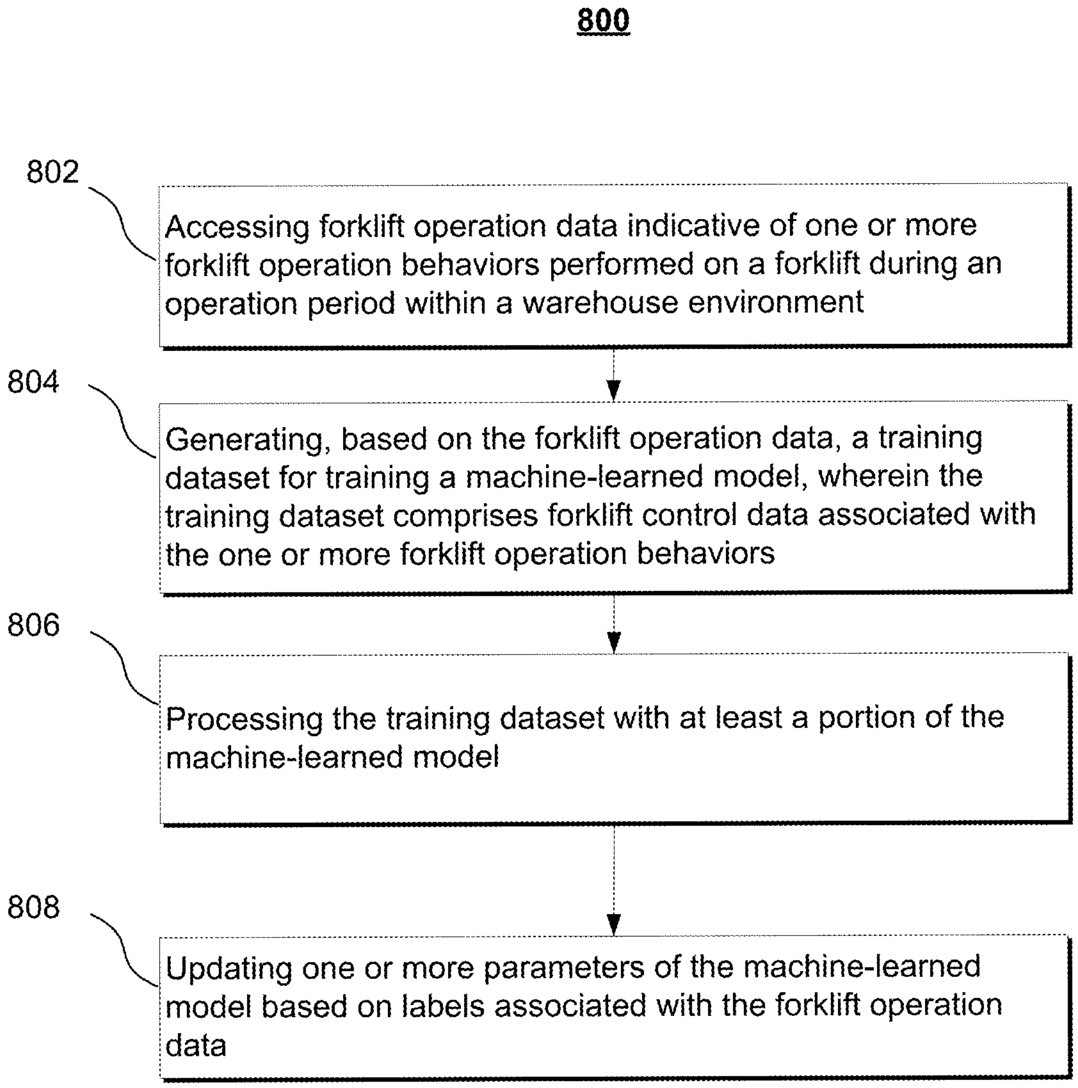
FIG. 8 depicts a flow chart of an example method, according to some implementations of the present disclosure.

FIG. 8 depicts a flow chart of an example method, according to some implementations of the present disclosure. One or more portion(s) of the method 800 may be implemented by a computing system that includes one or more computing devices such as, for example, the computing systems described with reference to the other figures (e.g., forklift 100, autonomy system 107, remote system(s), a system of FIGS. 1-6, etc.). Each respective portion of the method 800 may be performed by any (or any combination) of one or more computing devices. Moreover, one or more portion(s) of the method 800 may be implemented on the hardware components of the device(s) described herein (e.g., as in FIGS. 1-6, etc.), for example, to localize a forklift 100 and generate a motion plan 203 with respect to the same.

FIG. 8 depicts elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 may be performed additionally, or alternatively, by other systems.

At 802 the method 800 may include accessing forklift operations data indicative of one or more forklift operation behaviors performed on a forklift during an operation period within a warehouse environment. For instance, one or more forklifts 100 operating within a warehouse environment 200 may operate over a plurality of operation periods and generate forklift operations data 602. The forklift operations data 602 may indicate behaviors conducted by forklift operators, semi-autonomous forklifts, or autonomous forklifts as they complete missions. The forklift operations data 602 may be generated across a single forklift 100 or a plurality of forklifts 100 operating across one or more warehouse environments.

By way of example, a highly skilled forklift operator may operate a forklift 100 over a plurality of operation periods and perform various operation behaviors (e.g., via the forklift controls) to maneuver the forklift through the warehouse environment 200 and to complete assigned missions. The forklift operations data generated by the forklift operator may be stored and accessed by a computing system (e.g., model trainer, etc.). The computing system may be on-board the forklift 100 or remote from the forklift 100.

At 804 the method 800 may include generating, based on the operation data, a training dataset for training a machine-learned model, wherein the training dataset comprises forklift control data associated with the one or more forklift operation behaviors. For instance, the computing system can generate training data for training the localization model 600 and the motion planning model 601 using the forklift operations data 602.

By way of example, the computing system may analyze the forklift operations data 602 and generate one or more "ground-truth" labels indicating the type of forklift behaviors depicted. For instance, the forklift operations data 602 may include forklift control data indicating the controls used by the highly skilled forklift operator during the operation period. The forklift operations data 602 may also include image data depicting the surrounding environment of the forklift 100 providing additional context to other modalities included in the forklift operations data 602. In an embodiment, different modalities (e.g. tactile data, control data, image data etc.) within the forklift operations data may be concatenated or fused together to enrich the forklift operations dataset with additional features and context.

As such the computing system may label image data corresponding to tactile data, control data etc. depicting the state of the forklift 100 as the forklift operation behaviors are being performed. The labels may include various types of labels including, but not limited to forklift acceleration (e.g., indicating the acceleration of the forklift), forklift jerk (e.g., indicating a measure of sharp movement of the forklift), forklift turning speed (e.g., speed at which the forklift rotates). In some embodiments, the labels may be binary (e.g., indicating a successful or unsuccessful behavior). In some embodiments, the binary label may be a scaled label where numerical metric correlates to more positively or more negatively desired behavior. In other embodiments, the labels may differ to train the localization model 600 and the motion planning model 601. The labels may be generated automatically or manually annotated.

By way of example, the computing system may generate a forklift acceleration labels for training the localization model 600. For instance, the forklift acceleration label may be annotated on an image frame fused (e.g., based on timestamps) with corresponding accelerometer data indicating that the forklift 100 was accelerating at 15 miles per hour eighteen minutes into an operation period. In an embodiment, the forklift acceleration label may be used to help train a localization model 600. For instance, based on the acceleration (e.g., forklift acceleration label), the localization model 600 may be able to determine a relative position of the forklift over a period of time given the rate of acceleration.

In another example, the computing system may generate a forklift jerk label for training the motion planning model 601. For instance, the forklift jerk label may indicate significant jerk within the mast while moving an inventory item. In an embodiment the forklift jerk label may also be associated with the forklift control data (e.g., movement of the forklift controls) that caused the significant jerk. As such the motion planning model 601 may be able to determine what forklift behaviors (e.g., series of forklift control operations) cause significant jerk.

The computing system may segment the forklift operations data 602. For instance, the computing system may segment the forklift operations data 602 based on time stamps (e.g., short clips etc.) to encapsulate operation behaviors. As such the computing system may generate a training data set which provides a sequence of forklift operation behaviors which may be used to train the localization model 600 and the motion planning model.

At 806 the method 800 may include processing the training dataset with at least a portion of the machine-learned model. For instance, once the computing system may input the labelled forklift operations data (e.g., training dataset) into the localization model 600 and/or the motion planning model 601.

At 808 the method 800 may include updating one or more parameters of the machine-learned model based on labels associated with the operation data. For instance, the computing system may test the output of the localization model 600 and/or the motion planning model for errors (e.g., in determining the ground truth data). The errors may be backpropagated through the respective models and used to optimize the models by updating one or more parameters of the models. While examples herein describe backpropagation of errors, the present disclosure is not limited to such embodiment and any training techniques may be used to train the models.

Figure 9:
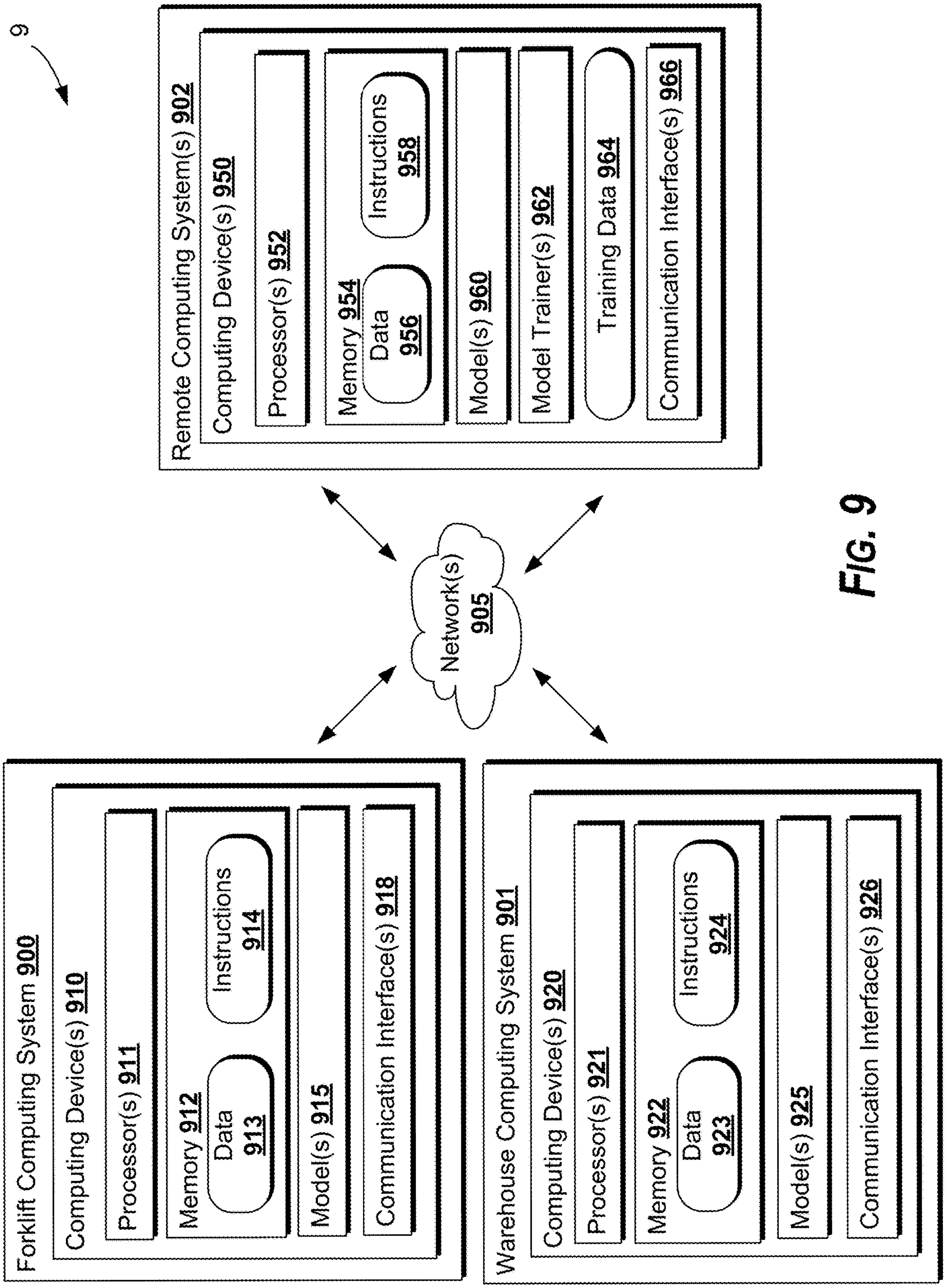
FIG. 9 depicts a block diagram of an example computing ecosystem, according to some implementations of the present disclosure.

FIG. 9 is a block diagram of an example computing ecosystem 9, according to some implementations of the present disclosure. The example computing ecosystem 9 may include a forklift computing system 900, a warehouse computing system 901, and one or more remote computing systems 902 that are communicatively coupled over one or more networks 905. In some implementations, the forklift computing system 900 and the warehouse computing system 901 may communicate through a contact connection (e.g., wired ethernet connection) when the forklift 100 is parked near a receiver of the warehouse computing system 901. In other implementations, the forklift computing system 900 and the warehouse computing system 901 may communicate over a wireless connection (e.g., wireless local area network (WLAN), wireless wide area network (WWAN), near-field communication, other shorter distance communication protocols, etc.) while the forklift computing system 900 is in operation (e.g., via the forklift sensors 500 etc.). In some implementations, the forklift computing system 900 or the warehouse computing system 901 may implement one or more of the systems, operations, or functionalities described herein for validating one or more systems or operational systems.

In some implementations, a remote computing system 902, the forklift computing system 900, and/or the warehouse computing system 901 may be communicatively coupled over one or more networks 905. The remote computing system 902 may be, for example, a cloud-based server system that is remote from the forklift computing system 900 and the warehouse computing system 901. This may include, for example, a computing system associated with a warehouse, an entity associated with the inventory (e.g., shipper, manager, operator), an entity associated with the forklift computing system 900 (e.g., manufacturer, distributor, operator, maintainer), an entity associated with the warehouse computing system 901 (e.g., manufacturer, distributor, operator, maintainer), etc. In some implementations, one or more of the networks 905 used to communicate with the remote computing system 902 may be different than one or more of the networks 905 used by the forklift computing system 900 and the warehouse computing system 901 to communicate with one another.

In some implementations, the computing devices 910 may be included in a forklift computing system 900 and be utilized to perform the functions of a forklift computing system 900 as described herein. For example, the computing devices 910 may be located onboard a forklift computing system 900 and implement the autonomy system 107 for autonomously or semi-autonomously operating the forklift computing system 900. In some implementations, the computing devices 910 may represent the entire onboard computing system or a portion thereof (e.g., the forklift localization system 108, the motion planning system 109, the forklift control system 110, or a combination thereof, etc.). In other implementations, the computing devices 910 may not be located onboard a forklift computing system 900. In some implementations, the forklift computing system 900 may include one or more distinct physical computing devices 910.

The forklift computing system 900 (e.g., the computing device(s) 910 thereof) may include one or more processors 911 and a memory 912. The one or more processors 911 may be any suitable processing device (e.g., a processor core, a microprocessor, an ASIC, a FPGA, a controller, a microcontroller, etc.) and may be one processor or a plurality of processors that are operatively connected. The memory 912 may include one or more non-transitory computer-readable storage media, such as RAM, ROM, EEPROM, EPROM, one or more memory devices, flash memory devices, etc., and combinations thereof.

The memory 912 may store information that may be accessed by the one or more processors 911. For instance, the memory 912 (e.g., one or more non-transitory computer-readable storage media, memory devices, etc.) may store data 913 that may be obtained (e.g., received, accessed, written, manipulated, created, generated, stored, pulled, downloaded, etc.). The data 913 may include, for instance, sensor data 115, mission data 116, data associated with autonomy functions (e.g., data associated with the perception, planning, or control functions), simulation data, or any data or information described herein. In some implementations, the forklift computing system 900 may obtain data from one or more memory device(s) that are remote from the forklift computing system 900.

The memory 912 may store computer-readable instructions 914 that may be executed by the one or more processors 911. The instructions 914 may be software written in any suitable programming language or may be implemented in hardware. Additionally, or alternatively, the instructions 914 may be executed in logically or virtually separate threads on the processor(s) 711.

For example, the memory 912 may store instructions 914 that are executable by one or more processors (e.g., by the one or more processors 911, by one or more other processors, etc.) to perform (e.g., with the computing device(s) 710, the forklift computing system 900, or other system(s) having processors executing the instructions) any of the operations, functions, or methods/processes (or portions thereof) described herein.

In some implementations, the forklift computing system 900 may store or include one or more models 915. In some implementations, the models 915 may be or may otherwise include one or more machine-learned models (e.g., a machine-learned operational system, etc.). As examples, the models 915 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the forklift computing system 900 may include one or more models for implementing subsystems of the autonomy system(s) 107, including any of: the forklift localization system 108, the motion planning system 109, or the forklift control system 110.

In some implementations, the forklift computing system 900 may obtain the one or more models 915 using communication interface(s) 918 to communicate with the warehouse computing system 901 over the network(s) 702. For instance, the forklift computing system 900 may store the model(s) 715 (e.g., one or more machine-learned models) in the memory 912. The forklift computing system 900 may then use or otherwise implement the models 915 (e.g., by the processors 911). By way of example, the forklift computing system 900 may implement the model(s) 915 to localize an forklift computing system 900 in the warehouse environment 200, perceive an forklift's 100 environment or objects therein, plan one or more future states of an forklift computing system 900 for moving through a warehouse environment 200, control an forklift computing system 900 for interacting with a warehouse environment 200, etc.

The warehouse computing system 901 may include one or more computing devices 920. The warehouse computing system 901 may include one or more processors 921 and a memory 922. The one or more processors 921 may be any suitable processing device (e.g., a processor core, a microprocessor, an ASIC, a FPGA, a controller, a microcontroller, etc.) and may be one processor or a plurality of processors that are operatively connected. The memory 922 may include one or more non-transitory computer-readable storage media, such as RAM, ROM, EEPROM, EPROM, one or more memory devices, flash memory devices, etc., and combinations thereof.

The memory 922 may store information that may be accessed by the one or more processors 921. For instance, the memory 922 (e.g., one or more non-transitory computer-readable storage media, memory devices, etc.) may store data 923 that may be obtained. The data 923 may include, for instance, sensor data 115, mission data 116, data associated with a warehouse environment inventory management system, data associated with inventory scanning missions, or any data or information described herein. In some implementations, the warehouse computing system 901 may obtain data from one or more memory device(s) that are remote from the forklift computing system 900.

For example, the memory 922 may store instructions 924 that are executable (e.g., by the one or more processors 921, by one or more other processors, etc.) to perform (e.g., with the computing device(s) 720, the warehouse computing system 901, or other system(s) having processors for executing the instructions, such as computing device(s) 910 or the forklift computing system 900) any of the operations, functions, or methods/processes described herein. This may also include, for example, validating a machined-learned operational system.

In some implementations, the warehouse computing system 901 may include one or more server computing devices. In the event that the warehouse computing system 901 includes multiple server computing devices, such server computing devices may operate according to various computing architectures, including, for example, sequential computing architectures, parallel computing architectures, or some combination thereof.

The forklift computing system 900 and the warehouse computing system 901 may each include communication interfaces 918 and 926, respectively. The communication interfaces 918 and 926 may be used to communicate with each other or one or more other systems or devices, including systems or devices that are remotely located from the forklift computing system 900 or the warehouse computing system 901. The communication interfaces 918 and 926 may include any circuits, components, software, etc. for communicating with one or more networks (e.g., the network(s) 905). In some implementations, the communication interfaces 918 and 926 may include, for example, one or more of a communications controller, receiver, transceiver, transmitter, port, conductors, software or hardware for communicating data.

In some embodiments, the communication interfaces 918 and 926 of the forklift computing system 900 and warehouse computing system 901 may communicate through physical contact or wired connection while the forklift computing system 900 is parked near a receiver of the warehouse computing system 901. For example, the communication interface 926 may include a mechanism (e.g., data pins) to transfer data to the communication interface 918. In some embodiments, when the forklift computing system 900 makes contact with a receiver of the warehouse computing system 901 (e.g., data pins) a high-speed telecommunication channel may be established to allow for communication between the forklift computing system 900 and the warehouse computing system 901.

In some embodiments, the communication interfaces 918 and 926 of the forklift computing system 900 and warehouse computing system 901 may communicate wirelessly as the forklift computing system 900 operates throughout the warehouse environment. For example, the communication interface 926 may emit a wireless signal (e.g., wireless local area network (WLAN)) which may be received by the communication interface 918 of the forklift computing system 900 as the forklift computing system 900 operates throughout the warehouse environment. In some embodiments, a connection may be established between the communication interfaces 918 and 926 when the signal strength emitted from communication interface 926 reaches a certain threshold. In some embodiments, the communication interface 726 may include a pool of internet protocol (IP) addresses that are dynamically assigned to the communication interface 718 of a forklift computing system 900 in range of the wireless signal.

The communication interfaces 718 and 726 may transition between contact (e.g., wired) communication and wireless communication. For example, when a forklift computing system 900 begins operation to execute an inventory scanning mission, the communication interface 926 of warehouse computing system 901 may beacon (e.g., regular transmissions to inform devices about available access points) via communication interfaces 918 of forklifts 100. In some embodiments, the communication interfaces 926 of the forklift computing system 900 may beacon every 5 seconds to detect a forklift computing system 900 in range of the emitted signal. In some embodiments, the communication interfaces 918 and 926 may automatically activate a contact (e.g., wired) connection when the forklift computing system 900 parks near a receiver of the warehouse computing system 901. In some embodiments, the contact connection may generate an ethernet connection.

In some embodiments, the communication interfaces 918 and 926 may maintain a constant connection. For example, a warehouse environment 200 may include multiple warehouse computing system receivers located throughout the warehouse environment 200. When a forklift computing system 900 operates within the warehouse environment 200, the wireless signal emitted from a first communication interface 926 of a first warehouse computing system 901 may decrease while the wireless signal emitted from a second communication interface 926 of a warehouse computing system 901 may increase. In some embodiments, the communication interfaces 918 and 926 may maintain a constant connection by seamlessly switching between different receivers as they operate throughout the warehouse environment 200. In some embodiments, the communication interfaces 918 and 926 may maintain a connection when the forklift computing system 900 docks on a warehouse computing system 901 and activates a contact (e.g., wired) connection.

The remote computing system 902 may include one or more computing devices 950. The remote computing system 902 may include one or more processors 952 and a memory 954. The one or more processors 952 may be any suitable processing device (e.g., a processor core, a microprocessor, an ASIC, a FPGA, a controller, a microcontroller, etc.) and may be one processor or a plurality of processors that are operatively connected. The memory 954 may include one or more non-transitory computer-readable storage media, such as RAM, ROM, EEPROM, EPROM, one or more memory devices, flash memory devices, etc., and combinations thereof.

The memory 954 may store information that may be accessed by the one or more processors 952. For instance, the memory 954 (e.g., one or more non-transitory computer-readable storage media, memory devices, etc.) may store data 956 that may be obtained. The data 956 may include, for instance, any data or information described herein. In some implementations, the remote computing system 902 may obtain data from one or more memory device(s) that are remote from the remote computing system 902.

For example, the memory 954 may store instructions 958 that are executable (e.g., by the one or more processors 952, by one or more other processors, etc.) to perform (e.g., with the computing device(s) 950, the remote computing system 902, or other system(s) having processors for executing the instructions) any of the operations, functions, or methods/processes described herein.

In some implementations, the remote computing system 902 includes or is otherwise implemented by one or more server computing devices. In instances in which the remote computing system 902 includes plural server computing devices, such server computing devices may operate according to sequential computing architectures, parallel computing architectures, or some combination thereof.

As described above, the remote computing system 902 may store or otherwise include one or more models 960. For example, the models 960 may be or may otherwise include various machine-learned models. Example machine-learned models include neural networks or other multi-layer nonlinear models. Example neural networks include feed forward neural networks, deep neural networks, recurrent neural networks, and convolutional neural networks. Some example machine-learned models may leverage an attention mechanism such as self-attention. For example, some example machine-learned models may include multi-headed self-attention models (e.g., transformer models).

The other systems of ecosystem 9 may train the models 915 and/or 925 via interaction with the remote computing system 902 that is communicatively coupled over the networks 905. The remote computing system 902 may be separate from the warehouse computing system 901 or may be a portion of the warehouse computing system 901.

The remote computing system 902 may include a model trainer 962 that trains the machine-learned models 915 and/or 960 stored at another computing system and/or the remote computing system 902 using various training or learning techniques, such as, for example, backwards propagation of errors. For example, a loss function may be backpropagated through the model(s) to update one or more parameters of the model(s) (e.g., based on a gradient of the loss function). Various loss functions may be used such as mean squared error, likelihood loss, cross entropy loss, hinge loss, and/or various other loss functions. Gradient descent techniques may be used to iteratively update the parameters over a number of training iterations.

In some implementations, performing backwards propagation of errors may include performing truncated backpropagation through time. The model trainer 962 may perform a number of generalization techniques (e.g., weight decays, dropouts, etc.) to improve the generalization capability of the models being trained.

In particular, the model trainer 962 may train the models 915 and/or 960 based on a set of training data 964. The training data 964 may include, for example, labelled training data including one or more labelled features.

The model trainer 962 includes computer logic utilized to provide desired functionality. The model trainer 962 may be implemented in hardware, firmware, and/or software controlling a general purpose processor. For example, in some implementations, the model trainer 962 includes program files stored on a storage device, loaded into a memory and executed by one or more processors. In other implementations, the model trainer 962 includes one or more sets of computer-executable instructions that are stored in a tangible computer-readable storage medium such as RAM, hard disk, or optical or magnetic media.

The network(s) 905 may be any type of network or combination of networks that allows for communication between devices. In some implementations, the network(s) may include one or more of a local area network, wide area network, the Internet, secure network, cellular network, mesh network, peer-to-peer communication link or some combination thereof and may include any number of wired or wireless links. Communication over the network(s) 905 may be accomplished, for instance, through a network interface using any type of protocol, protection scheme, encoding, format, packaging, etc.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. Some of the claims are described with a letter reference to a claim element for exemplary illustrated purposes and is not meant to be limiting.

What is claimed is:

1. A computing system comprising:

one or more processors; and one or more non-transitory computer-readable media storing instructions that when executed by the one or more processors cause the computing system to perform operations, the operations comprising:

accessing map data comprising a dimensional layout of a warehouse environment;

receiving, from one or more forklift sensors associated with a forklift, forklift operation data, the forklift operation data indicative of one or more forklift operation behaviors performed during an operation period;

receiving from one or more scanning sensors, inventory data, the inventory data indicative of one or more inventory items scanned during the operation period; and based at least in part on the map data, the forklift operation data, and the inventory data, concurrently generating localization data to localize the forklift in the warehouse environment during the operation period.

2. The computing system of claim 1, wherein the forklift is at least one of (i) an autonomous, (ii) a semi-autonomous forklift, or (iii) a human operated forklift.

3. The computing system of claim 1, wherein the forklift operation data is generated by a forklift operator, wherein the forklift operator operates the forklift during the operation period.

4. The computing system of claim 1, wherein the one or more forklift operation behaviors comprises at least one of:

(i.) navigating the forklift through the warehouse environment, (ii.) adjusting a vertical position of a mast associated with the forklift, (iii.) moving the one on more inventory items from a first location to a second location, or (iv.) scanning the one or more inventory items.

5. The computing system of claim 1, wherein the operations further comprise:

analyzing the forklift operation behaviors to generate a ground truth dataset, wherein the ground truth dataset is used to train a machine-learned model.

6. The computing system of claim 1, wherein at least one forklift sensor of the one or more forklift sensors is positioned on a backrest of the forklift.

7. The computing system of claim 1, wherein concurrently generating localization data comprises:

accessing mission data associated with the operation period, wherein the mission data is indicative of an expected locations of the one or more inventory items within the warehouse environment; and based on the mission data, concatenating the map data, the forklift operation data, and the inventory data to determine a location and a position of the forklift within the warehouse environment at a time during the operation period.

8. The computing system of claim 7, wherein concurrently generating localization data comprises:

in response to concatenating the map data, the forklift operation data, and the inventory data, determining a path of travel of the forklift, the path of traveling comprising one or more waypoints that lead to the expected locations of the one or more inventory items.

9. The computing system of claim 7, wherein the operations further comprise:

generating, based on the location and the position, a motion plan for the forklift, the motion plan indicative of at least one of an updated location or an updated position of the forklift; and controlling the forklift based on the motion plan.

10. The computing system of claim 7, wherein the position of the forklift is indicative of at least one of: (i) an orientation of the forklift relative to a rack or (ii) a vertical mast position of the forklift.

11. The computing system of claim 1, wherein the localization data is generated concurrently using a machine-learned model, the machine-learned model configured to concurrently concatenate operation data and the inventory data.

12. The computing system of claim 1, wherein the forklift sensors comprise at least one of (i) a forklift control sensor, or (ii) an image sensor.

13. The computing system of claim 12, wherein the (i) forklift control sensor is configured to capture control data comprising at least (i) a degree angle of an operation wheel onboard the forklift, or (i) a throttle on board the forklift.

14. A computer-implemented method comprising:

accessing map data comprising a dimensional layout of a warehouse environment;

receiving, from one or more forklift sensors associated with a forklift, forklift operation data, the forklift operation data indicative of one or more forklift operation behaviors performed during an operation period;

receiving from one or more scanning sensors, inventory data, the inventory data indicative of one or more inventory items scanned during the operation period; and based at least in part on the map data, forklift operation data, and inventory data, concurrently generating localization data to localize the forklift in the warehouse environment during the operation period.

15. The computer-implemented method of claim 14, wherein the forklift is at least one of (i) an autonomous, (ii) a semi-autonomous forklift, or (iii) a human operated forklift.

16. The computer-implemented method of claim 14, wherein the forklift operation data is generated by a forklift operator, wherein the forklift operator operates the forklift during the operation period.

17. The computer-implemented method of claim 14, wherein the one or more forklift operation behaviors comprises at least one of:

(i.) navigating the forklift through the warehouse environment, (ii.) adjusting a vertical position of a mast associated with the forklift, (iii.) moving the one on more inventory items from a first location to a second location, or (iv.) scanning the one or more inventory items.

18. The computer-implemented method of claim 14, further comprising:

analyzing the forklift operation behaviors to generate a ground truth dataset, wherein the ground truth dataset is used to train a machine-learned model.

19. The computer-implemented method of claim 14, wherein concurrently generating localization data comprises:

accessing mission data associated with the operation period, wherein the mission data is indicative of an expected locations of the one or more inventory items within the warehouse environment; and based on the mission data, concatenating the map data, the forklift operation data, and the inventory data to determine a location and a position of the forklift within the warehouse environment at a time during the operation period.

20. A non-transitory computer-readable media storing instructions that are executable by one or more processors to perform operations, the operations comprising:

accessing map data comprising a dimensional layout of a warehouse environment;

receiving, from one or more forklift sensors associated with a forklift, forklift operation data, the forklift operation data indicative of one or more forklift operation behaviors performed during an operation period;

receiving from one or more scanning sensors, inventory data, the inventory data indicative of one or more inventory items scanned during the operation period; and based at least in part on the map data, forklift operation data, and inventory data, concurrently generating localization data to localize the forklift in the warehouse environment during the operation period.

* * * * *